US010592118B2

(12) United States Patent
Chan et al.

(10) Patent No.: US 10,592,118 B2
(45) Date of Patent: *Mar. 17, 2020

(54) HIERARCHICAL PRE-FETCH PIPELINING IN A HYBRID MEMORY SERVER

(71) Applicant: International Business Machines Corporation, Armonk, NY (US)

(72) Inventors: Yuk Lung Chan, Poughkeepsie, NY (US); Rajaram B. Krishnamurthy, Poughkeepsie, NY (US); Carl Joseph Parris, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,211

(22) Filed: Feb. 21, 2019

(65) Prior Publication Data

US 2019/0187895 A1 Jun. 20, 2019

Related U.S. Application Data

(60) Continuation of application No. 15/813,354, filed on Nov. 15, 2017, now Pat. No. 10,228,863, which is a
(Continued)

(51) Int. Cl.
*H04L 29/08* (2006.01)
*H04L 12/24* (2006.01)
(Continued)

(52) U.S. Cl.
CPC .............. *G06F 3/061* (2013.01); *G06F 3/065* (2013.01); *G06F 3/067* (2013.01); *G06F 3/0608* (2013.01);
(Continued)

(58) Field of Classification Search
CPC .... G06F 16/172; G06F 16/182; G06F 3/0644; G06F 12/0862; G06F 3/0685; H04L 29/08729; H04L 41/5054; H04L 47/24
See application file for complete search history.

(56) References Cited

U.S. PATENT DOCUMENTS 6,138,213 A 10/2000 McMinn
6,185,625 B1 2/2001 Tso et al.
(Continued)

FOREIGN PATENT DOCUMENTS

CN 1531303 9/2004
JP 10124359 5/1998
(Continued)

OTHER PUBLICATIONS

Notice of Allowance dated May 6, 2016, received for U.S. Appl. No. 13/337,704. May 6, 2016.
(Continued)

*Primary Examiner* — Ashgar H Bilgrami
(74) *Attorney, Agent, or Firm* — Fleit Intellectual Property Law; Thomas S. Grzesik

(57) ABSTRACT

A method, hybrid server system, and computer program product, prefetch data. A set of prefetch requests associated with one or more given datasets residing on the server system are received from a set of accelerator systems. A set of data is prefetched from a memory system residing at the server system for at least one prefetch request in the set of prefetch requests. The set of data satisfies the at least one prefetch request. The set of data that has been prefetched is sent to at least one accelerator system, in the set of accelerator systems, associated with the at least one prefetch request.

20 Claims, 18 Drawing Sheets

Related U.S. Application Data continuation of application No. 15/139,405, filed on Apr. 27, 2016, now Pat. No. 9,857,987, which is a division of application No. 13/337,704, filed on Dec. 27, 2011, now Pat. No. 9,418,235, which is a continuation of application No. 12/822,760, filed on Jun. 24, 2010, now Pat. No. 8,898,324.

(51) Int. Cl.

| | |
|---|---|
| H04L 12/851 | (2013.01) |
| G06F 3/06 | (2006.01) |
| G06F 16/172 | (2019.01) |
| G06F 16/182 | (2019.01) |
| G06F 12/0868 | (2016.01) |
| G06F 12/0862 | (2016.01) |
| G06F 15/177 | (2006.01) |
| G06F 21/60 | (2013.01) |

(52) U.S. Cl.
CPC .......... *G06F 3/0644* (2013.01); *G06F 3/0653* (2013.01); *G06F 3/0685* (2013.01); *G06F 3/0688* (2013.01); *G06F 12/0862* (2013.01); *G06F 12/0868* (2013.01); *G06F 15/177* (2013.01); *G06F 16/172* (2019.01); *G06F 16/182* (2019.01); *G06F 21/602* (2013.01); *H04L 29/08729* (2013.01); *H04L 41/5054* (2013.01); *H04L 47/24* (2013.01); *G06F 2212/264* (2013.01); *G06F 2212/602* (2013.01)

(56) References Cited

U.S. PATENT DOCUMENTS

| | | | |
|---|---|---|---|
| 6,363,411 | B1 | 3/2002 | Dugan et al. |
| 6,538,996 | B1 | 3/2003 | West et al. |
| 6,941,341 | B2 | 9/2005 | Logston et al. |
| 7,188,240 | B1 | 3/2007 | Berstis et al. |
| 7,243,136 | B2 | 7/2007 | Huston et al. |
| 7,331,038 | B1 | 2/2008 | Snodgrass et al. |
| 7,395,322 | B2 | 7/2008 | Harvey et al. |
| 7,478,164 | B1 | 1/2009 | Lango et al. |
| 7,797,279 | B1 * | 9/2010 | Starling .............. G06F 11/1451 707/641 |
| 7,865,570 | B2 | 1/2011 | Sun |
| 7,937,404 | B2 * | 5/2011 | Tripathi .............. G06F 12/0862 707/770 |
| 7,975,025 | B1 | 7/2011 | Szabo et al. |
| 8,019,811 | B1 | 9/2011 | Britto et al. |
| 8,205,205 | B2 | 6/2012 | Franke |
| 8,468,244 | B2 | 6/2013 | Redlich et al. |
| 8,489,672 | B2 | 7/2013 | Sebastian et al. |
| 8,489,673 | B2 | 7/2013 | Sebastian et al. |
| 8,516,193 | B1 | 8/2013 | Clinton et al. |
| 8,645,376 | B2 * | 2/2014 | Robinson ............ H04L 67/2847 707/621 |
| 2001/0037400 | A1 | 11/2001 | Raz et al. |
| 2002/0176418 | A1 | 11/2002 | Hunt et al. |
| 2003/0005457 | A1 | 1/2003 | Faibish et al. |
| 2003/0095783 | A1 | 5/2003 | Binder et al. |
| 2006/0037072 | A1 | 2/2006 | Rao et al. |
| 2006/0242275 | A1 | 10/2006 | Shapiro |
| 2006/0253584 | A1 | 11/2006 | Dixon et al. |
| 2007/0126608 | A1 | 6/2007 | Sriram |
| 2007/0143484 | A1 | 6/2007 | Drouet et al. |
| 2007/0180144 | A1 | 8/2007 | Basu et al. |
| 2008/0091812 | A1 | 4/2008 | Lev-Ran et al. |
| 2008/0126716 | A1 | 5/2008 | Daniels |
| 2008/0228864 | A1 | 9/2008 | Plamondon |
| 2008/0250024 | A1 | 10/2008 | Kvm et al. |
| 2008/0262741 | A1 | 10/2008 | Harris et al. |
| 2008/0320151 | A1 | 12/2008 | McCanne et al. |
| 2009/0254572 | A1 | 10/2009 | Redlich et al. |
| 2010/0005061 | A1 | 1/2010 | Basco et al. |
| 2010/0023674 | A1 | 1/2010 | Aviles |
| 2010/0070457 | A1 | 3/2010 | Kejariwal et al. |
| 2010/0077468 | A1 | 3/2010 | Pragides et al. |
| 2010/0122026 | A1 | 5/2010 | Umamageswaran et al. |
| 2010/0179987 | A1 | 7/2010 | Sebastian et al. |
| 2010/0268882 | A1 | 10/2010 | Cargnoni et al. |
| 2012/0117312 | A1 | 5/2012 | Chan et al. |

FOREIGN PATENT DOCUMENTS

| | | |
|---|---|---|
| JP | 2001222459 | 8/2001 |
| JP | 2001337888 | 12/2001 |
| JP | 2005018770 | 1/2005 |
| JP | 2006065850 | 3/2006 |
| JP | 2006277186 | 10/2006 |
| JP | 2007213235 | 8/2007 |
| JP | 2008299811 | 12/2008 |
| JP | 2009163741 | 7/2009 |
| JP | 2010519637 | 6/2010 |
| WO | 2009038911 | 3/2009 |

OTHER PUBLICATIONS

Final Office Action dated May 25, 2016, received for U.S. Appl. No. 13/837,245. May 25, 2016.

Non-Final Office Action dated Apr. 13, 2012 received for U.S. Appl. No. 12/822,790 Apr. 13, 2012.

Bhatia. L., et al., "Leveraging Semi-Formal and Sequential Equivalence Techniques for Multimedia SOC Performance Validation,"DAC 2007, Jun. 4-8, 2007, San Diego, CA, Copyright 2007, SCM 978-1-59593-627-1/07/0006. Jun. 2007.

Ferrer, R., et al., "Evaluation of Memory Performance on the Cell BE with the SARC Programming Model," MEDEA 08, Oct. 26, 2008, Toronto, Canada, Copyright 2008 ACM, 978-1-60558-243-6/08/10. Oct. 26, 2008.

Hartenstein, R., "A Decade of Reconfigurable Computing: a Visionary Retrospective," Copyright 2001 IEEE, 0-7695-0993-2/2001, 2001.

U.S. Patent Application Entitled: Speculative and Coordinated Data Access in a Hybrid Memory Server, Filed Herewith (Jun. 24, 2010). Jun. 24, 2010.

International Search Report and Written Opinion for PCT/EP2010/067053 dated Sep. 13, 2011. Sep. 13, 2011.

Partial International Search Report dated Aug. 8, 2011 for PCT/EP2010/067052 Aug. 8, 2011.

International Search Report and Written Opinion dated Oct. 18, 2011 for PCT/EP2010/067052. Oct. 18, 2011.

Final Office Action dated Sep. 14, 2012 received for U.S. Appl. No. 12/822,790 Sep. 14, 2012.

Non-Final Office Action dated Apr. 11, 2013 received for U.S. Appl. No. 13/675,270. Apr. 11, 2013.

Non-Final Office Action dated Aug. 13, 2013 received for U.S. Appl. No. 12/822,760 Aug. 13, 2013.

Final Office Action dated Feb. 12, 2014 received for U.S. Appl. No. 12/822,760 Jan. 12, 2014.

Chinen, K., et al., "The Design and Implementation of Hybrid Prefeching Proxy Server for WWW", The IEICE Transaction, The Institute of Electronics Information and Communication Engineers, Japan, pp. 907-915 Nov. 25, 1997.

Non-Final Office Action dated Jul. 30, 2014 received for U.S. Appl. No. 13/337,731. Jul. 30, 2014.

Non-Final Rejection dated Sep. 28, 2015 received for U.S. Appl. No. 13/837,245. Sep. 28, 2015.

European Examination Report dated Jan. 23, 2017, received for European Application No. 10776355.9. Jan. 23, 2017.

Hesina, G., et al., "A Network Architecture for Remote Rendering", Proceedings of the Second International Workshop on Distributed Interactive Simulation and Real-Time Applications, Jul. 19-20, 1998, pp. 1-4. Jul. 1998.

(56) References Cited

OTHER PUBLICATIONS

Shi, S., et al., "Real-Time Remote Rendering of 3D Video for Mobile Devices", Proceedings of the 17th ACM International Conference on Multimedia, Oct. 19-24, 2009, pp. 1-10. Oct. 2009.

* cited by examiner

HIERARCHICAL PRE-FETCH PIPELINING IN A HYBRID MEMORY SERVER

FIELD OF THE INVENTION

The present invention generally relates to out-of-core processing, and more particularly relates to a hybrid memory server in an out-of-core processing environment.

BACKGROUND OF THE INVENTION

An out-of-core processing environment generally refers to an environment where a storage device maintains data that is processed by a more powerful processing device where only portion of the data currently being processed resides on the processing device. For example, the storage device might contain model data with computational processing being assigned to the more powerful processing device. Conventional out-of-core processing environments are generally inefficient with respect to resource utilization, user support, and security. For example, many conventional out-of-core processing environments can only support one user at a time. Also, these systems allows for data sets to reside at the accelerators, thereby opening the system to vulnerabilities. Many of these conventional environments utilize Network File System (NFS), which can page out blocks leading to reduced system response. These conventional environments also support model data rendering for visualization in read-only mode and do not support updates and modifications/annotations to the data sets. Even further, some of these conventional environments only use DRAM to cache all model data. This can be expensive for some usage models.

SUMMARY OF THE INVENTION

In one embodiment, a method, with a server system in an out-of-core processing environment, for prefetching data is disclosed. The method comprises a set of prefetch requests associated with one or more given datasets residing on the server system are received from a set of accelerator systems. A set of data is prefetched from a memory system residing at the server system for at least one prefetch request in the set of prefetch requests. The set of data satisfies the at least one prefetch request. The set of data that has been prefetched is sent to at least one accelerator system, in the set of accelerator systems, associated with the at least one prefetch request.

In another embodiment, hybrid server system in an out-of-core processing environment is disclosed. The hybrid server system comprises a server and a set of accelerator systems that is communicatively coupled to the server. The server comprises a memory system and at least a first prefetcher communicatively coupled to the memory system. Each accelerator system in the set of accelerator systems comprises at least one processing core and at least a second prefetcher. The first prefetcher is configured to receive a set of prefetch requests from the second prefetcher of at least one accelerator system in the set of accelerator systems. The set of prefetch requests is associated with one or more given datasets residing on the server system. The first prefetcher is further configured to prefetch, for at least one prefetch request in the set of prefetch requests, a set of data from the memory system residing at the server system. The set of data satisfies the at least one prefetch request. The first prefetcher is also configured to send the set of data that has been prefetched to at least one accelerator system, in the set of accelerator systems, associated with the at least one prefetch request.

In yet another embodiment, a computer program product for managing data access in an out-of-core processing environment is disclosed. The computer program product comprises a storage medium readable by a processing circuit and storing instructions for execution by the processing circuit for performing a method. The method comprises a set of prefetch requests associated with one or more given datasets residing on a server system are received from a set of accelerator systems. A set of data is prefetched from a memory system residing at the server system for at least one prefetch request in the set of prefetch requests. The set of data satisfies the at least one prefetch request. The set of data that has been prefetched is sent to at least one accelerator system, in the set of accelerator systems, associated with the at least one prefetch request.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one as or more than one. The term plurality, as used herein, is defined as two as or more than two. Plural and singular terms are the same unless expressly stated otherwise. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Operating Environment

Figure 1:
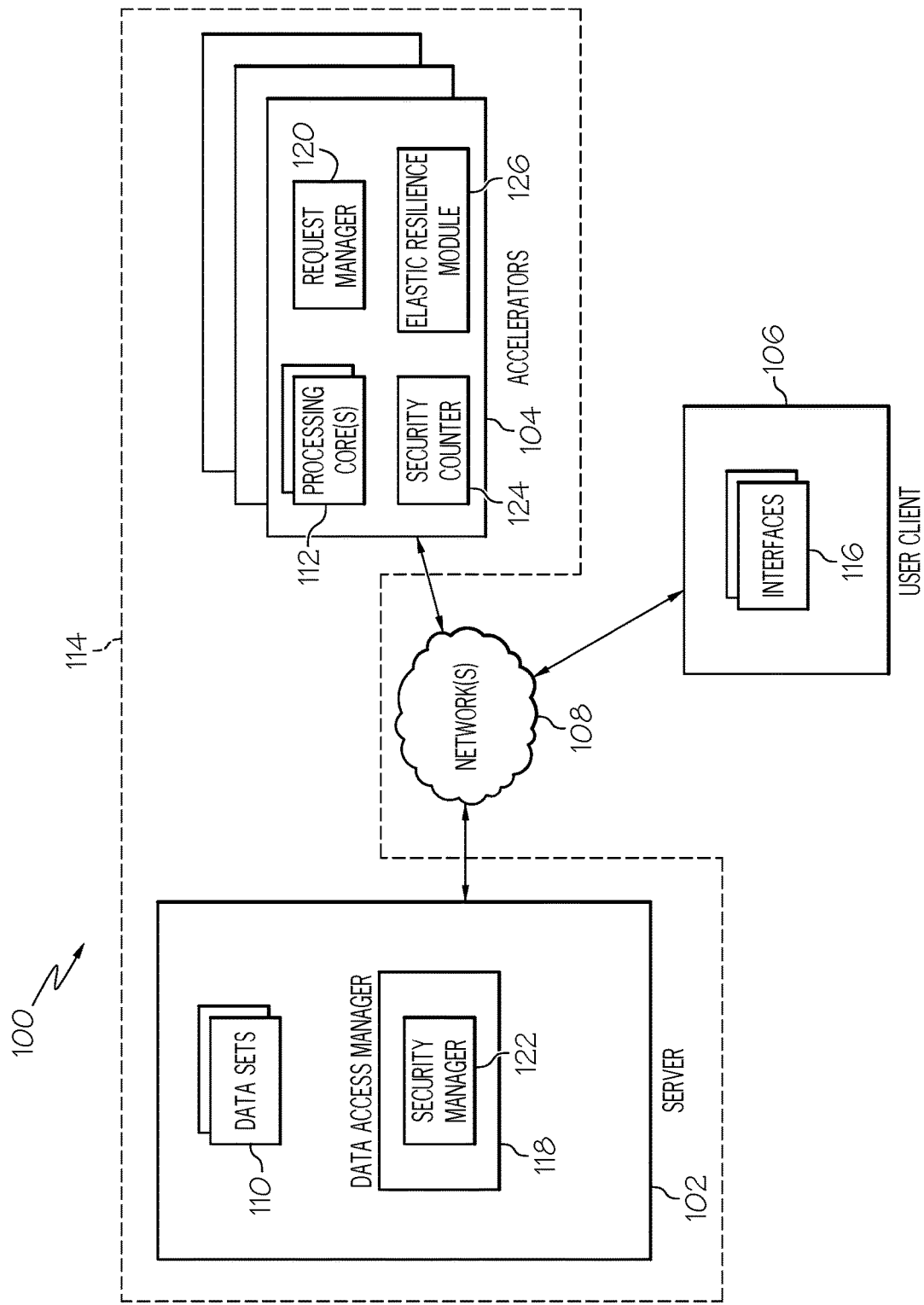
FIG. 1 is a block diagram illustrating one example of an operating environment according to one embodiment of the present invention.

FIG. 1 shows one example of an operating environment applicable to various embodiments of the present invention. In particular, FIG. 1 shows a server system 102, a plurality of accelerator systems 104, and one or more user clients 106 communicatively coupled via one or more networks 108. The one or more networks 108 can be any type of wired and/or wireless communications network. For example, the network 108 may be an intranet, extranet, or an internetwork, such as the Internet, or a combination thereof. The network(s) 108 can include wireless, wired, and/or fiber optic links.

In one embodiment, the server system 102 is any type of server system such as, but not limited to, an IBM® System z server. The server system 102 can be a memory server that comprises one or more data sets 110 such as, but not limited to, modeling/simulation data that is processed by the accelerator systems 104 and transmitted to the user client 106. In addition to the accelerator systems 104 accessing the data sets 110 on the server system 102, the user client 106 can also access the data sets 110 as well. The server 102, in one embodiment, comprises a data access manager 118 that manages the data sets 110 and access thereto. The server 102 also comprises a security manager 122 that manages the security of the data sets 110. The security manager 122 can reside within or outside of the data access manager 118. The data access manager 118 and the security manager 122 are discussed in greater detail below. The accelerators 104, in one embodiment, comprise a request manager 120 that manages requests received from a user client 106 and retrieves the data 110 from the server to satisfy these requests. The accelerators 104, in one embodiment, can also comprise a security counter 124 for implementing a vulnerability window with respect to cached data. The accelerators 104 can further comprise an elastic resilience module 126 that provides resiliency of applications on the accelerators 104. The request manager 122, security counter 124, and elastic resilience module 126 are discussed in greater detail below.

The accelerator systems 104, in one embodiment, are blade servers such as, but not limited to, IBM® System p or System x servers. Each of the accelerators 104 comprises one or more processing cores 112 such as, but not limited to, the IBM® PowerPC or Cell B/E processing cores. It should be noted that each of the accelerator systems 104 can comprise the same or different type of processing cores. The accelerator systems 104 perform most of the data processing in the environment 100 of FIG. 1, whereas the server system 102 is mostly used to manage the data sets 110. The user client 106, in one embodiment, is any information processing system such as, but not limited to, a workstation, desktop, notebook, wireless communication device, gaming console, and the like that allows a user to interact with the server system 102 and/or the accelerator systems 104. The combination of the server system 102 and the accelerator systems 104 is herein referred to as a hybrid server or hybrid memory server 114 because of the heterogeneous combination of various system types of the server 102 and accelerators 104. The user client 106 comprises one or more interfaces 116 that allow a user to interact with the server system 102 and/or the accelerator systems 104. It should be noted that the examples of the server system 102, accelerator systems 104, and user client 106 given above are for illustrative purposes only and other types of systems are applicable as well.

The environment 100 of FIG. 1, in one embodiment, is an out-of-core processing environment. The out-of-core processing environment 100 of FIG. 1 generally maintains a majority of the data on one or more storage devices residing at and/or communicatively coupled to the server system 102 while only keeping the data that is being processed at the accelerator systems 104. For example, in an embodiment where the data sets 110 at the server 102 are modeling data a user at the client system 106 interacts with a model via the interface 116. User commands are communicated from the client system 106 to one or more accelerator systems 104. The one or more accelerator systems 104 request portions of the modeling data from the server system 102 that satisfy the user commands. These portions of the modeling data are processed by the accelerator system(s) 104. The accelerator systems 104 request and process only the portion of the model data from the server system 102 that is needed to satisfy the users' requests. Therefore, the majority of the modeling data remains on the server system 102 while only the portion of the modeling data that is being processed resides at the accelerator systems 104. The accelerator system(s) 106 then provides the processed (e.g. graphical rendering, filtering, transforming) modeling data to the user client system 106. It should be noted that the server system 102 can assign a given set of accelerators to a given set of data sets, but this is not required.

As discussed above, conventional out-of-core processing environments are generally inefficient with respect to resource utilization, user support, and security. For example, many conventional out-of-core processing environments can only support one user at a time. Also, these systems allow for data sets to reside at the accelerators, thereby opening the system to vulnerabilities. Many of these conventional environments utilize Network File System (NFS), which can page out blocks leading to reduced system response at the server 102. These conventional environments also support model data processing (rendering) in read-only mode and do not support updates and modifications/annotations to the data sets. Even further, some of these conventional environments only use DRAM to cache all model data. This can be expensive for some usage models.

Therefore, as will be discussed in greater detail below, various embodiments of the present invention overcome the problems discussed above with respect to conventional out-of-core processing environments as follows. One or more embodiments allow multiple users to be supported in the out-of-core processing environment 100. For example, these embodiments utilize separate physical accelerators, virtualized accelerators, and/or support multiple users on the same physical accelerator, thereby sharing the same cache. Various embodiments allow the out-of-core processing environment 100 to be used in various modes such as where a data set is cached on the server 102 only; a data set is cached on the server 102 and the accelerator 104; a data set is cached on the accelerator 104 using demand paging; and a data set is cached on the accelerator 104 by downloading the data set during system initialization.

One or more embodiments reduce latency experienced by conventional out-of-core processing environments by utilizing (i) an explicit prefetching protocol and (ii) a speculative push-pull protocol that trades higher bandwidth for lower latency. In other embodiments, a custom memory server design for the system 102 can be implemented from scratch. Alternatively, elements of the custom memory server design can be added to an existing NFS server design. The out-of-core processing environment 100 in other embodiments supports modifications and annotations to data. Also, some usage models require the server to be used only in a "call-return" mode between the server and the accelerator. Therefore, one or more embodiments allow data intensive processing to be completed in "call-return" mode. Also, secure distributed sandboxing is used in one or more embodiments to isolate users on the "model", server, accelerator, and user client. Even further, one or more embodiments allow certain data to be cached in fast memory such as DRAM as well as slow memory such as flash memory.

Hybrid Server with Heterogeneous Memory

Figure 2:
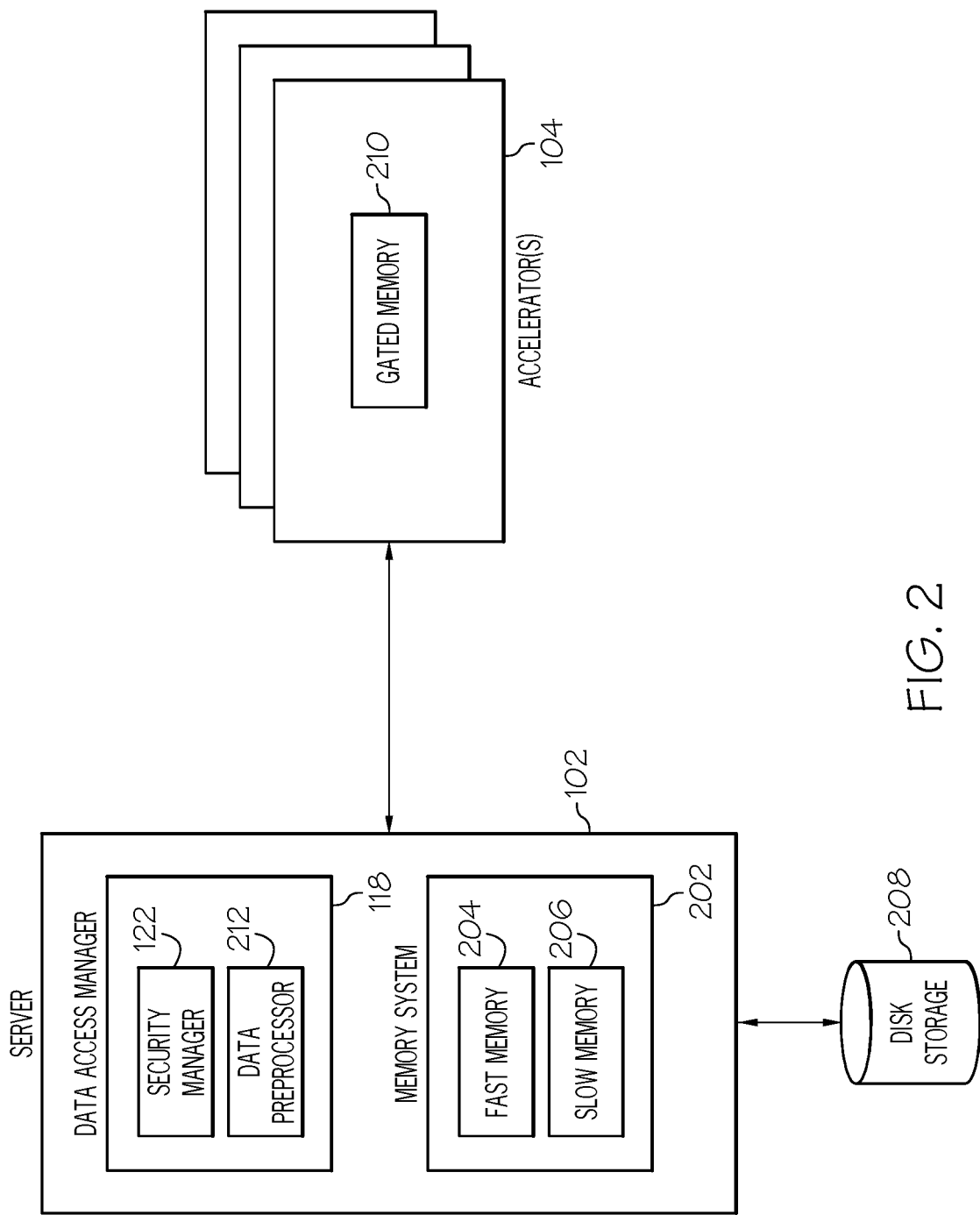
FIG. 2 is a block diagram showing one example of a hybrid memory server configuration in an out-of-core processing environment according to one embodiment of the present invention.

The server 102, in one embodiment, comprises a heterogeneous memory system 202, as shown in FIG. 2. This heterogeneous memory system 202, in one embodiment, comprises fast memory 204 such as DRAM and slow memory 206 such as flash memory and/or disk storage 208. The fast memory 204 is configured as volatile memory and the slow memory 206 is configured as non-volatile memory. The server 102, via the data access manager 118, can store the data sets 110 on either the fast memory 204, slow memory 206, or a combination of both. For example, if the server 102 is running portions of an application prior to these portions being needed, the server 102 stores data sets required by these portions in the slower memory 206 since they are for a point in time in the future and are, therefore, not critical to the present time. For example, simulations in a virtual world may run ahead of current time in order to plan for future resource usage and various other modeling scenarios. Therefore, various embodiments utilize various memory types such as flash, DRAM, and disk memory. Also, in one or more embodiments, blocks replaced in fast memory 204 are first evicted to slow memory 206 and then to disk storage 208. Slow memory 206 can be used as metadata and the unit of data exchange is a data structure fundamental building block rather than a NFS storage block.

In addition to the memory system 202 resident on the server 102, the server 102 can also access memory 210 on the accelerators 104. For example, once the accelerator 104 finishes processing data in a given memory portion, the accelerator 104 can release this memory portion to the server 102 and allow the server 102 to utilize this memory portion. Gated memory is also associated with a server. The server can process data and store results in memory by disallowing external accelerator access. The server can then choose to allow accelerators access by "opening the gate" to memory. Also, the memory system 202, in one embodiment, can be partitioned into memory that is managed by the server 102 itself and memory that is managed by the accelerators 104 (i.e., memory that is released by the server to an accelerator). Having memory in the memory system 202 managed by the accelerators 104 allows the accelerators 104 to write directly to that memory without taxing any of the processing resources at the server 102. The flash memory modules may be placed in the server's IO bus for direct access by the accelerators 104. These flash memory modules may have network links that receive messages from the accelerator 104. A processor on the flash memory modules may process these messages and read/write values to the flash memory on the flash memory IO modules. Flash memory may also be attached to the processor system bus alongside DRAM memory. A remote accelerator may use RDMA (Remote Direct Memory Access) commands to read/write values to the system bus attached flash memory modules.

Also, this configuration allows the accelerators 104 to pass messages between each other since this memory is shared between the accelerators 104. These messages can be passed between accelerators 104 utilizing fast memory 204 for communications with higher importance or utilizing slow memory 206 for communications of lesser importance. Additionally, data and/or messages can be passed between slow memory modules as well. For example, an accelerator 104 can fetch data from a slow memory 206 and write it back to another slow memory 206. Alternatively, if the slow memory modules are on the same I/O bus line, the slow memory modules can pass data/messages back and forth to each other. The slow memory on the server 102 acts as a reliable temporary or buffer storage. This obviates the need for accelerators 104 to buffer data on their scarce accelerator resident memory. Each accelerator 104 can have private flash memory modules on the server 102 assigned to it along with public memory areas accessible by all accelerators. If data has to be transferred to another accelerator, this data does not have to be read back to the accelerator's memory but can be transferred within the confines of the server 102 using inter-flash memory module transfers. These transfers may can be completed on the system bus or IO bus. This can save an accelerator 104 several round-trips for copy of data to another accelerator. Accelerators 104 can therefore use the switched network to communicate short messages between themselves and use the slow memory on the server 102 to exchange long/bulk messages or messages with deferred action requirements. The slow memory is advantageous because it allows the accelerator 104 to complete processing for related data items and "release" this memory to the server 102 or another accelerator without having to transform or marshal the results for consumption by the server 102 or another accelerator. This improves latency and overall performance of the system.

The following are more detailed examples of the embodiments given above. In one example, a data set 110 is a file that is structured as NFS share with clients "mmap"-ing the file. "mmap" is an operating system call used by clients to access a file using random access memory semantics. The NFS file portions are stored in the NFS block buffer cache in DRAM as file bytes are touched. However, in some situations the blocks stored in memory can be replaced with other blocks if an "age" based or "LRU" policy is in effect. Replaced blocks will incur additional latency as access to disk may be required. Therefore, another embodiment creates a RAMdisk in DRAM and maps the RAMdisk file system into the NFS file system. A RAMdisk, in yet another example, is created using flash memory and the RAMdisk file system is mapped into the NFS file system. For applications with DRAM bandwidth requirements, metadata is stored in flash memory while high bandwidth data is stored in DRAM. Replaced DRAM blocks can be stored in flash memory rather than writing them to disk. Flash memory can serve as "victim" storage.

It should be noted that NFS blocks are first accessed by the accelerators 104. Relevant data is then extracted from NFS blocks. In the memory design of one or more embodiments of the present invention, the granularity of data exchange is a data structure fundamental building block. This allows data to be directly accessed from the server 102 and written directly to accelerator data structures. For example, a binary tree with three levels might be identified as a fundamental building block. The fundamental building block may be used as a unit of transfer between the server and the accelerator.

In additional embodiments, the server 102 is able to preprocess, via a preprocessing module 212, data stored in the memory system 202 to transform this data into a format that can be processed by a processing core 112 of the requesting accelerator 104 without having to convert the data. In other words, the server 102 pre-stores and pre-structures this data in such a way that the accelerators 104 are not required to perform any additional operations to process the data. For example, an accelerator 104 can comprise an IBM® Cell B/E processing core 112. Therefore, the server 102 is able to preprocess data into a format or data structure that is required by the Cell B/E processing core so that the accelerator 104 can process this data without having to first transform the data into the required format. It should be noted that in addition to transforming the data into a format required by an accelerator 104 the server 102 can also transform the data into a format or data structure for a given operation. For example, if the server 102 determines that a given data set usually has sort operations performed on it the server 102 can transform this data set into a form suitable for sort operations. Therefore, when the accelerator 104 receives the data set it can perform the sort operation without having to format the data.

Also, a user is able to annotate the data sets 110 while interacting with the data at the user client system 106. As the user annotates the data 110, the accelerator 104 writes the annotation information back at the server 102 so additional users are able to view the annotations. In embodiments where multiple users are accessing a data set such as a model, the user first obtains a write lock to data region that needs to be updated. This write lock is granted and managed by the data access manager 118. Annotations may be made without obtaining a lock, but changes to annotations need write locks. Updates to data structures by clients result in entries being marked as stale on clients with cached data. These entries are then refreshed when needed.

Data Staging on the Hybrid Server

The following is a detailed discussion on embodiments directed to staging data across the hybrid server 114. As discussed above, the server system 102 of the hybrid server 114 comprises one or more data sets 110 that are processed by the accelerators 104. Therefore, to provide secure and efficient access to the portions of the data sets 110 processed by the accelerators 104, various data staging architectures in the hybrid server 114 can be utilized.

In one embodiment, the data access manager 118 manages how data is accessed between the server system 102 and the accelerators 104. In one embodiment, the data access manager 118 resides on the server system 102, one or more of the accelerators 104, and/or a remote system (not shown). In one embodiment, the data access manager 118 can assign one set of accelerators to a first data set at the server system and another set of accelerators to a second set data set. In this embodiment, only the accelerators assigned to a data set access that data set. Alternatively, the data access manager 118 can share accelerators across multiple data sets.

The data access manager 118 also configures the accelerators 104 according to various data access configurations. For example, in one embodiment, the data access manager 118 configures an accelerator 104 to access the data sets 110 directly from the server system 102. Stated differently, the accelerators 104 are configured so that they do not cache any of the data from the data sets 110 and the data sets 110 are only stored on the server system 102. This embodiment is advantageous in situations where confidentiality/security and reliability of the data set 110 is a concern since the server system 102 generally provides a more secure and reliable system than the accelerators 104.

Figure 3:
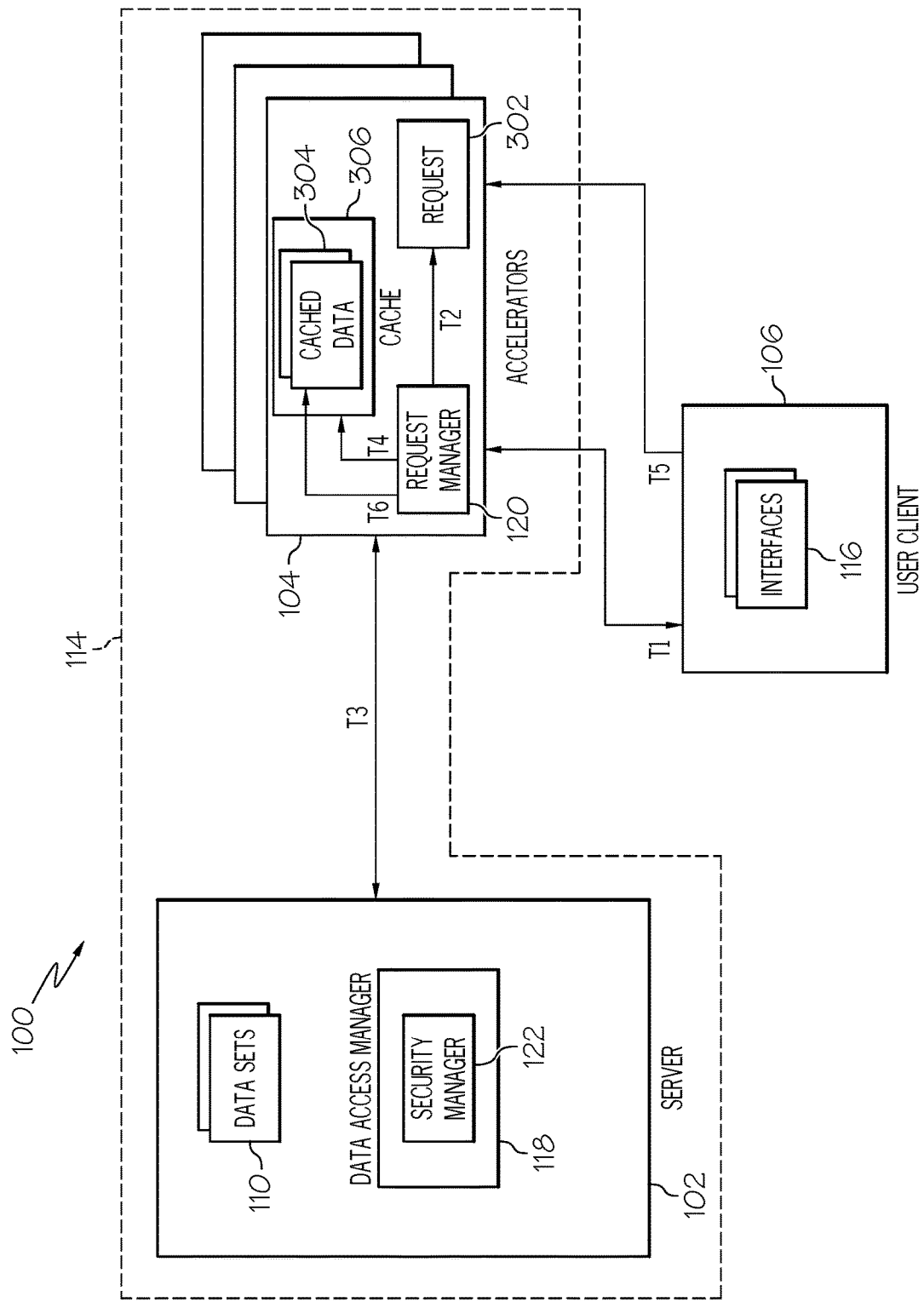
FIG. 3 is a block diagram showing one example of an accelerator configuration in an out-of-core processing environment according to one embodiment of the present invention.

In another embodiment, the data access manager 118 configures an accelerator 104 to retrieve and store/cache thereon all of the data of a data set 110 to be processed by the accelerator 104, as shown in FIG. 3. For example, one or more accelerators 104, at T1, receive a request to interact with a given model such as an airplane model. The request manager 120 at the accelerator(s) 104 analyzes, at T2, the request 302 and retrieves, at T3, all or substantially all of the data 304 from the server system 102 to satisfy the user's request. The accelerator 104, at T4, then stores this data locally in memory/cache 306. Now when an access request is received from the user client 106, at T5, the accelerator 104, at T6, accesses the cached data 304 locally as compared to requesting the data from the server system 102.

It should be noted that in another embodiment, the data access manager 118 configures the accelerator 104 to retrieve and store/cache the data set during system initialization as compared to performing these operations after receiving the initial request from a user client. This downloading of the data set to the accelerator 104 can occur in a reasonable amount of time with a fast interconnect between the accelerator 104 and server system 102. Once stored in memory 306, the data set 304 can be accessed directly at the accelerator 104 as discussed above.

Figure 4:
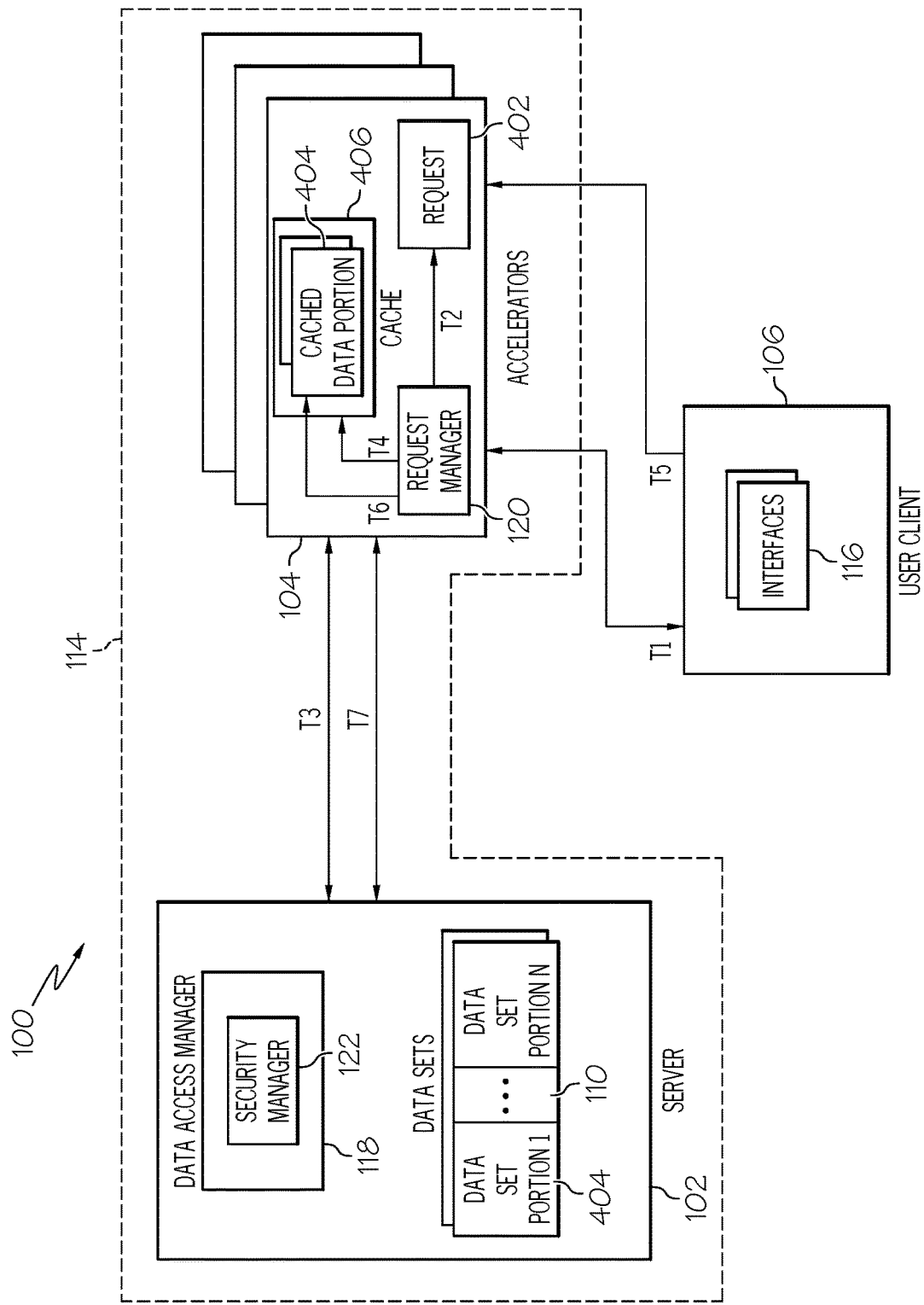
FIG. 4 is a block diagram showing another example of an accelerator configuration in an out-of-core processing environment according to one embodiment of the present invention.

In an alternative embodiment, the data access manager 118 configures the accelerators 104 to retrieve and store/cache only a portion 404 of a data set 110 that is required to satisfy a user's request while the remaining portion of the data set remains at the server system 102, as shown in FIG. 4. For example, one or more accelerators 104, at T1, receive a request 402 to interact with a given model such as a credit card fraud detection model. The request manager 120 at the accelerator 104 analyzes the request, at T2, and retrieves, at T3, as much of the data 110 from the server system 102 that satisfies the user's request as its memory 406 allows. The accelerator 104, at T4, then stores this data 404 locally in memory/cache 406. Now when an access request is received from the user client 106, at T5 the accelerator 104 either, at T6, accesses the cached data 404 locally and/or, at T7, accesses the data set 110 at the server system depending on whether the local data is able to satisfy the user's request with the portion of data 404 that has been cached. As can be seen from this embodiment, the accelerator 104 only accesses data on the server system 102 on a need basis.

The configurations of the accelerators 104 can be performed statically and/or dynamically by the data access manager 118. For example, a system administrator can instruct the data access manager 118 to statically configure an accelerator according to one of the embodiments discussed above. Alternatively, a set of data access policies can be associated with one or more of the accelerators 104. These data access policies indicate how to configure an accelerator 104 to access data from the server 102. In this embodiment, the data access manager 118 identifies a data access policy associated with a given accelerator 104 and statically configures the accelerator 104 according to one of the data access embodiments discussed above as indicated by the data access policy.

Alternatively, the data access manager 118 can dynamically configure each of the accelerators 104 based on one of the access configurations, i.e., store/cache all the entire data set, a portion of the data set, or to not cache any data at all. In this embodiment, the data access manager 118 utilizes an access context that can comprise various types of information such as data ports, user attributes, security attributes associated with the data, and the like to determine how to dynamically configure an accelerator 104. For example, the data access manager 118 can identify the ports that the data is being transferred from the server 102 to the accelerator 104 and/or from the accelerator 104 to the user client 106. Based on the identified ports the data access manager 118 can dynamically configure the accelerator 104 to either store/cache all the entire data set, a portion of the data set, or to not cache any data at all depending on the security and/or reliability associated with a port. Data access policies can be used to indicate which access configuration is to be used when data is being transmitted over a given set of ports.

In another example, the data access manager 118 dynamically configures the accelerators 104 based on the data set 110 to be accessed. For example, data sets 110 can comprise different types of data, different types of confidentiality requirements, and the like. This information associated with a data set 110 that is used by the data access manager 118 to determine how to dynamically configure the accelerators 104 can be stored within the data set itself, in records associated with the data set, and the like. Based on this information the data access manager 118 dynamically configures the accelerators 104 according to one of the access configurations discussed above. For example, if the data access manager 118 determines that a given data set 110 requires a high degree of confidentiality then the data access manager 118 can configure an accelerator 104 to only access the data set 110 from the server 102 without caching any of the data set 110. Data access policies can be used in this embodiment to indicate which access configuration is to be based on the metadata associated with the data set 110.

Additionally, in another example the data access manager 118 dynamically configures the accelerators 104 based on the user at the user client 106 requesting access to a data set 110. For example, users may have different access rights and permissions associated with them. Therefore, in this example, the data access manager 118 identifies various metadata associated with a user such as access rights and permissions, data usage history, request type (what the user is requesting to do with the data), and the like. Based on this user metadata the data access manager 118 dynamically configures the accelerator 104 according to one of the access configurations. It should be noted that the user metadata can be stored in user records at the server 102, accelerators 104, and/or a remote system.

In addition to the data access manager 118, the hybrid server 114 also comprises a security manager 122, as discussed above. The security manager 122 can be part of the data access manager 118 or can reside outside of the data access manager 118 as well either on the server system 102, one or more accelerators 104, and/or a remote system. The security manager 122 provides elastic security for the hybrid server 114. For example, the security manager 122 can manage the dynamic configuration of the accelerators 104 according to the access configurations discussed above. In addition, the security manager 122 can dynamically apply various levels of security to communication links between the server 102 and each accelerator 104.

In this embodiment, the security manager 122 provides a fully encrypted link between the server 102 and the accelerator 104 or a modified encrypted link that comprises less strength/encryption on partial data on the link, but higher performance since every piece of data is not encrypted. In one embodiment, a system administrator or a user at the user client 106 can select either a fully encrypted link or a modified encrypted link. In another embodiment, the security manager 122 selects either a fully encrypted link or a modified encrypted link based on the ports the data is being transmitted on and/or the data being accessed, similar to that discussed above with respect to the data access configurations. In yet another embodiment, the security manager 122 selects either a fully encrypted link or a modified encrypted link based on the access configuration applied to an accelerator 104. For example, if an accelerator 104 has been configured to only access the data set 110 from the server 102 and to not cache any of the data, the security manager 122 can fully encrypt the link between the server 102 and the accelerator 104. If, on the other hand, the accelerator 104 has been configured to cache the data set 110 the security manager 122 can provide a partially encrypted (lower encryption strength or partial encryption of data) link between the server 102 and the accelerator 104.

In an embodiment where data is cached on an accelerator 104 (e.g., FIG. 3 and FIG. 4), the security manager 122 also implements a vulnerability window mechanism. In this embodiment, the security manger 122 instructs the accelerator 104 to maintain a counter 124 for the data cached at the accelerator 104. Once the counter 124 reaches a given value the data in the cache is no longer accessible. For example, the accelerator 104 deletes the data, overwrites the data, or the like. The given value can be a default value such as, but not limited to, a time interval or a number of accesses. Alternatively, the security manger 122 can set the given value and instruct the accelerator 124 to count to this given value. Also, different data sets or portions of data sets can be associated with different values. For example, each portion of a data set 110 cached at the accelerator 104 can be associated with a different counter and value. It should be noted that if all of the data is cached at an accelerator 104 and there is only a single user requesting access then once the user is done accessing the data the accelerator 104 can remove the data from the cache prior to the vulnerability window expiring. However, if multiple users are requesting access to the data then the data needs to remain at the accelerator 104 until the vulnerability window expires since other users may require access to the data.

The vulnerability window mechanism allows the security manager 122 to adjust the security level in the hybrid server 114 to allow a partially encrypted link to increase performance while still ensuring the security of data by requiring the accelerator to drop/delete the data in its cache. A system designer can choose to make suitable tradeoffs between the encryption strength of a link and the duration of the vulnerability window. Similar considerations can be used to set the duration of the vulnerability window based on the designer's confidence level of the accelerator system's security provisioning. The vulnerability window mechanism also ensures that data is not maintained in the accelerator cache for long periods of time so that new data can be cached.

Because the security manager 122 configures the communication links between the server 102 and the accelerators 104 with a given level of security, the data cached by the accelerators 104, in some embodiments, is encrypted. In some instances, two or more accelerators 104 are accessing the same cached data sets. For example, a first accelerator can satisfy requests from a first user and a second accelerator can satisfy requests from a second user. If these users are accessing the same model, for example, then there is a high probability that the first and second users will request access to the same data. Therefore, when one of the accelerators decrypts data in its cache it can share the decrypted data with the other accelerator that is accessing the same data set. This way, the other accelerator is not required to decrypt the data and can save processing resources. It should be noted that if a vulnerability window is being applied to this decrypted data at the first accelerator, this vulnerability window is applied to the decrypted data when the data is shared with the second accelerator.

As can be seen from the above discussion, the accelerators 104 are able to be configured in various ways for accessing data sets to satisfy user requests. The hybrid server 114 also provides dynamic security environment where the security levels can be adjusted with respect to the communication links between the server 102 and accelerators 104 and with respect to how an accelerator caches data. In addition, each accelerator 104 can be configured to provide elastic resilience. For example, it is important to be able to recover from a software crash on the accelerators 104 so that important data is not lost and the user experience continues uninterrupted.

In one embodiment, elastic resilience is provided on the accelerators by an elastic resilience module 126. The elastic resilience module 126 can dynamically configure an accelerator to either have a single instance or multiple copies of software programs running at one time. The elastic resilience module 126 can shift these configurations based on user's requests, the nature of the data being accessed, performance required and available resources. Resilience is provided by having at least two copies of same program running at the same time. In this embodiment the software programs cross check each other so each program always knows what the other is doing. Therefore, if one of the programs crashes then the other program can seamlessly take over the processing for the program that has crashed.

Coordinated Speculative Data Push-Pull

As discussed above, some usage models require the server 102 to only be used in call-return mode between the server 102 and accelerators 104. In this type of configuration the accelerators 104 themselves are not allowed to make accesses to the server 102. Therefore, in one or more embodiments, the user's clients 106 send requests, commands, etc. to the server 102 as compared to sending them directly to the accelerators 104, a shown in FIG. 5. These embodiments utilize the call-return path through the server 102 and setup a protocol tunnel 502 with a data snoop. Call-return allows a secure implementation of the hybrid server 114.

In these embodiments the data access manager 118 can process requests received by the server 102 directly from the user client 106 in various ways. In one example, requests received from a client 106 are tunneled from the input of the server directly to the accelerators 104. In another example, these requests are processed on the server 102 and the results sent back to user client 106. The user client 106 can then "push" this data to one or more accelerators for processing where the accelerators 104 send back the processed data to the user client 106 along the protocol tunnel 502. However, if the user client 106 comprises enough resources to efficiently perform the processing itself the user client 106 does not need to push the data to an accelerator 104. In yet another example, incoming requests are mirrored to the both the accelerator 104 and server 102 along the protocol tunnel 502. For example, the server 102 maintains a copy of the actual requests and passes the request or the copy to the accelerator 104. Additionally, the server 102, in another example, pushes result data corresponding to small requests to the user client 106, but allows long/bulk results to be served by requests of the user client to the accelerator 102. For example, requests that result in long/bulk results are passed to the accelerator 104 where the accelerator requests the corresponding data from the server 102. In addition, long request messages can be sent to the accelerators 104 along the protocol tunnel 502 to ease "proxy" processing (on behalf of the accelerators 102) on the server 102. Duplicate requests can be dropped on the server 102.

Figure 5:
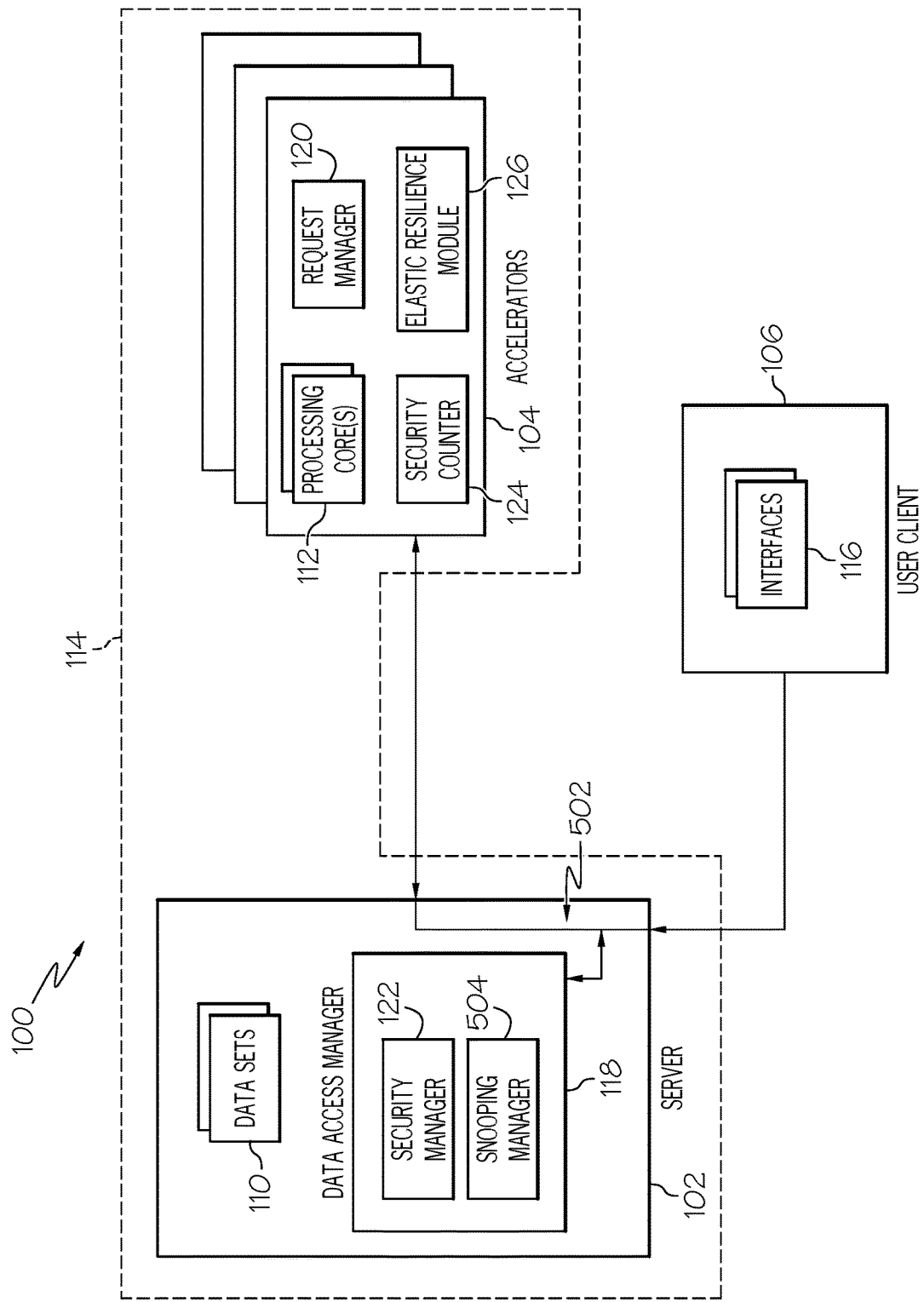
FIG. 5 is a block diagram showing one example of a tunnel protocol configuration of a hybrid memory server in an out-of-core processing environment according to one embodiment of the present invention.

The protocol tunnel is configured so that the request is received at one network port and is then sent to the accelerators 104 through another network port. However, the server 102 comprises a snooping module 504, as shown in FIG. 5, which can reside either within the data access manager or outside of the data access manager. The snooping module 504 snoops into the requests that are being received and passed to the accelerators to identify the data sets or portions of data sets that will be required by the accelerators to satisfy the requests. The data access manager is then able to push the data sets or portions of data sets that have been identified to the accelerators. In one embodiment any pushed data received by an accelerator from the server is stored in a separate "push" cache and is not stored with pulled data. However, this embodiment is not required. Therefore, when the accelerators receive the requests they do not have to retrieve the data sets from the server since the server has already begun sending the required data sets to the accelerators. Requests from user clients 106 can be tagged with a bit which serves as an indication to the accelerator that data required for the request is already on the way. The accelerator 104 can thus avoid a data request to the server 102. Such a "push-pull" protocol is advantageous when the user client 106 does not have complete knowledge of all potential positions of a user but the server 102 is likely to have this information and updates to the data sets from different users can be reflected in the data set and then "pushed" to other users.

One advantage of the above embodiments is that because all user requests are first directed to the server 102, the server 102 has knowledge of multiple user requests. For example, in conventional out-of-core processing environments, each accelerator can generally only support one user at a time. Therefore, these conventional environments are usually not able to perform any type of speculative push/pull operations based on other users' usage patterns. However, because in one or more embodiments of the present invention the requests from user clients 106 are first sent to the server 102, the server 102 monitors what data sets all of the user clients 106 are accessing. This allows the server 102 to predict or speculate what data will be needed in the future for a given user client(s) 106 based on data requested by a plurality of users in the past or based on data currently being requested by users. The server 102 is then able to push this data out to the appropriate accelerators 104 similar to the embodiments already discussed above.

For example, consider an embodiment where the server 102 comprises a model of an airplane. Users navigate through the airplane graphical model with real-time display on the users' client machines 106. Based on the requests from multiple users the server 102 determines that when most of the users are in a first level of the luggage compartment that they navigate to the second level of the luggage compartment. Then, when the server 102 determines that a user is in the first level of the luggage compartment based on received requests, the server 102 can push data for the second level of the luggage compartment to the corresponding accelerator(s) 104. Therefore, the accelerator 104 already has the data (and in some instances will have already processed the data) for the second level of the luggage compartment prior to receiving a request from the user to access the second level. This embodiment mitigates any delays that would normally be experienced by the accelerator 104 in a configuration where the accelerator 104 has to wait until the request is received for access to the second level before accessing this data from the server 102.

In additional embodiments, the data access manager 118 monitors data being pulled by the accelerators 104 to satisfy a request to determine data to push to the accelerators 104. These embodiments are applicable to an environment configuration where a request is sent from a user client 106 to the accelerator 104 or is sent from the user client 106 to the server 102 using the protocol tunneling embodiment discussed above. As an accelerator 104 pulls data from the server 102 to satisfy a request, the server 102 can push any related data to the accelerator 104 so that accelerator 104 will already have this data when needed and will not have to perform additional pull operations. For example, in an embodiment where the data sets 110 comprise data stored in a hierarchical nature such as a hierarchical tree, when the server 102 determines that the accelerator 104 is pulling a top element of a tree the server predicts/speculates that the accelerator 104 will eventually require leaf elements associated with the pulled top element. Therefore, the server 102 pushes these leaf elements to the accelerator 104. In one embodiment these push/pull operations occur in tandem, i.e., the server pushes data out to the accelerator while the accelerator is pulling related data from the server.

In another embodiment, the server 102 performs semantic parsing, via the data access manager, of the data being pulled by an accelerator 104 to determine the data to push to the accelerator 104. In other words, the server 102, in this embodiment, does not just send all data related to data currently being pulled by an accelerator 104 but sends data that is relevant to pulled data. For example, consider an example where the data set 110 at the server 102 is for a virtual world. A user via the user client 106 navigates to an area where there are three different paths that the user can select. As the accelerator 104 is pulling data from the server 102 to display these three paths to the user, the server 102 semantically analyzes this pulled data and determines that the user is only able to select the first path since the user has not obtained a key for the second and third paths. Therefore, the server 102 only pushes data associated with the first path to the accelerator 104. It will be understood that a brute-force approach to pushing data that is just based on dataset usage locality is likely to be inefficient. This brute-force approach may yield data items adjacent to a data item being addressed but not useful to a user application. Instead one or more embodiments of the present invention semantically parse requests so that locality and affinity to application-level objects manipulated by a user can be used to push data to the accelerator 104. This strategy reduces latency and allows increased efficiency by making "push"-ed data more useful to an application user context.

It should be noted that push/pull data movement can significantly enhance the processing of multiple models nested inside a larger model. When accelerators 104 pull data from the server and the data pertains to an entity that has an independent model defined, the server 102 can push the model data directly onto the accelerator 104. Any subsequent accesses are directed to the local copy of the nested model. Sharing of the model for simultaneous reads and writes can be achieved by locking or coherent updates.

Prefetch Pipelining

In addition to the coordinated speculative data push/pull embodiments discussed above, the hybrid server 114 is also configured for application level prefetching, i.e., explicit prefetching. In this embodiment, where implicit prefetching occurs during NFS based reads (fread or read on a mmap-ed fileshare), explicit prefetching is used to prefetch data based on the semantics of the application being executed. It should be noted that implicit prefetching can yield data blocks that are contiguously located because of spatial locality, but may not be useful to an application user context. A typical application user context in virtual world or modeling/graphical environment consists of several hundred to thousand objects with hierarchies and relationships. Explicit prefetching allows object locality and affinity in a user application context to be used for prefetching. These objects may not be necessarily laid out in memory contiguously. Explicit prefetching follows users' actions and is more likely to be useful to a user than brute-force implicit prefetching. In one embodiment, based on state information of a user in an application, the application may request ahead of time blocks of data that an application or user may need. Such blocks are stored in a speculative cache with a suitable replacement strategy using aging or a least recently used (LRU) algorithm. This allows the speculative blocks to not replace any deterministic cached data.

Figure 6:
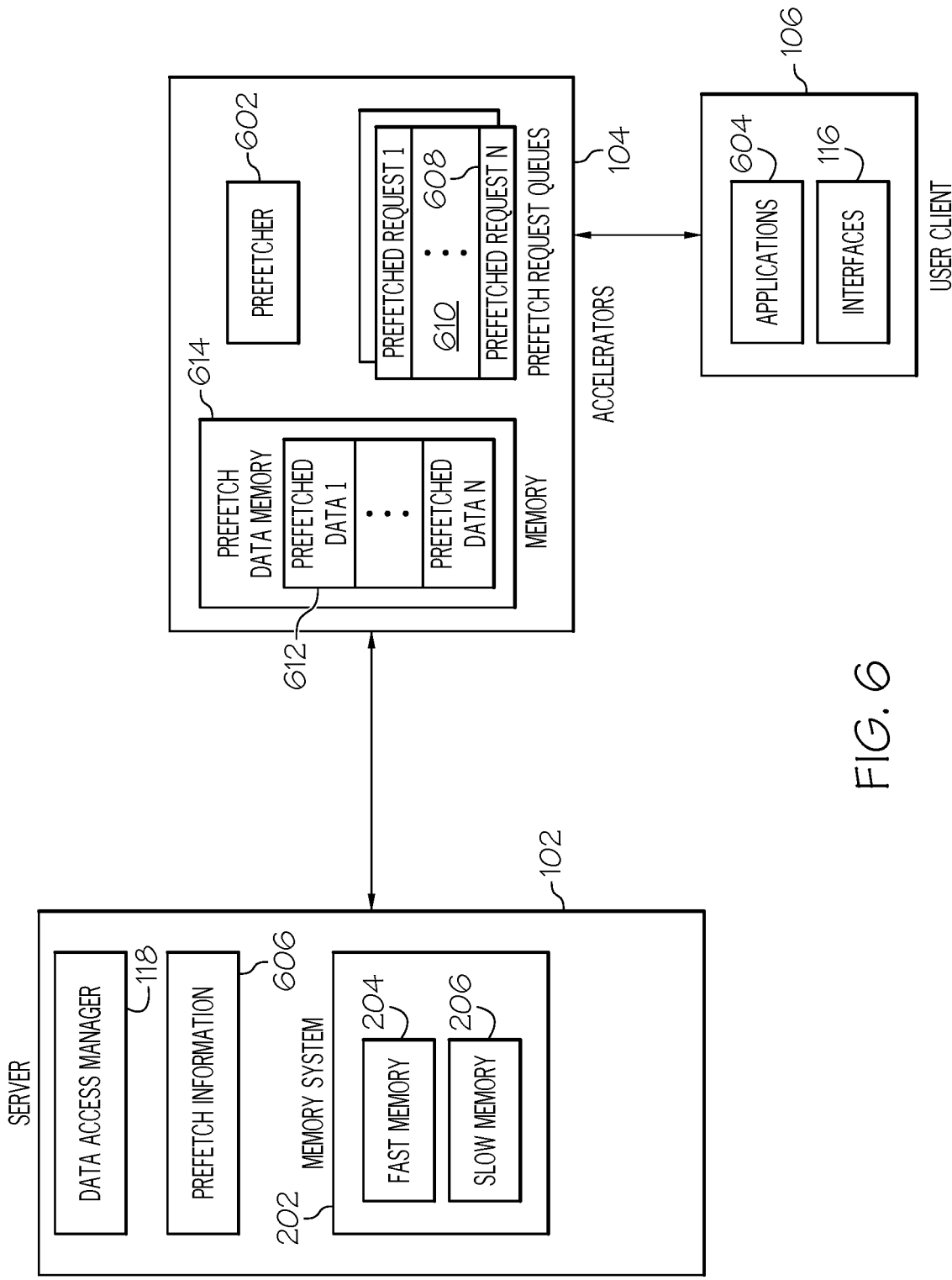
FIG. 6 is a block diagram showing one example of a prefetching configuration of an accelerator in an out-of-core processing environment according to one embodiment of the present invention.

In one embodiment, one or more accelerators 104 comprise one or more prefetchers 602, as shown in FIG. 6, that prefetch data for applications 604 running on the user client 106. It will be understood that state maintenance processing of applications 604 running on the user client 106 may run on the server 102. Application processing may in effect be distributed across the server 102 and user client but prefetch may be triggered by processing at the user client 106. However, it should be noted that the one or more prefetchers can also reside on the server system 102 as well. The prefetcher(s) 602 is an n-way choice prefetcher that loads data associated with multiple choices, situations, scenarios, etc. associated with a current state of the application. The prefetcher analyzes a set of information 606 maintained either at the server 102 and/or the accelerator(s) 104 or user client 106 that can include user choices and preferences, likely models that need user interaction, current application state, incoming external stream state (into the server 102), and the like to make prefetch choices along multiple dimensions. The n-way prefetcher takes as input, the prefetch requests of a set of different prefetchers. Each prefetcher makes requests based on different selection criteria and the n-way prefetcher may choose to issue requests of one or more prefetchers.

For example, consider an application such as a virtual world running on the server 102. In this example, the user via the user client 106 navigates himself/herself to a door that allows the user to proceed in one of two directions. As the user approaches the door, the application can cache blocks from all the possible directions that the user can take on the accelerator 104. When the user chooses to pick a direction, data corresponding to one "direction" can be retained and the other "direction" data may be dropped. Note that the user can always retrace his/her steps so every "direction" can be retained for future use depending on memory availability and quality of service requirements. Prefetching mitigates any delays that a user would normally experience if the data was not prefetched.

Additionally, in some situations a user may not be able to select either of the two directions, but only one of the directions. Therefore, the prefetcher 602 analyzes prefetch information 606 such as user choice history, to identify the path that the user is able to select and only prefetches data for that path. This is similar to the semantic parsing embodiment discussed above.

In one embodiment an accelerator 104 comprises prefetch request queues 608 that store prefetch requests from the application 604 residing at the user client 106. For example, if the application 604 is in a state where a door is presented to a user with a plurality of paths that can be taken, the application 604 sends multiple prefetch requests to the accelerator 104, one for each of the paths. These prefetch requests are requesting that the accelerator 104 prefetch data associated with the given path. The accelerator 104 stores each of these prefetch requests 608 in a prefetch request queue 610. The prefetch request queue 610 can be a temporary area in fast memory such as DRAM, a dedicated portion in fast memory, or can reside in slow memory such as flash memory. The prefetcher 602 then assigns a score to each of the prefetch requests in the queue based on resource requirements associated with prefetch request. For example, the score can be based on the memory requirements for prefetching the requested data. Scoring can also be based on how much the prefetching increases the user experience. For example, a score can be assigned based on how much the latency is reduced by prefetching a given data set.

Once the scores are assigned, the prefetcher 602 selects a set of prefetch requests from the prefetch request queues 610 to satisfy with that have the highest scores or a set of scores above a given threshold. The accelerator 104 sends the prefetch request to the server 102 to prefetch the required data. In embodiments where multiple prefetchers 602 are utilized either on the same accelerator or across different accelerators, if the same data is being requested to be prefetched these multiple prefetch requests for the same data set can be merged into a single request and sent to the server 102.

It should be noted that the prefetch requests can be dropped by the server 102 or by the accelerator 104. For example, in most situations the data being requested for prefetching is not critical to the application 604 since this data is to be used sometime in the future. Therefore, if the server 102 or the accelerator 104 do not comprise enough resources to process the prefetch request, the request can be dropped/ignored.

The server 102 retrieves the data to satisfy the prefetch request and sends this data back to the accelerator 104. In one embodiment, the server 102, via the data access manager, analyzes the prefetch data to determine if any additional data should be prefetched as well. The server 102 identifies other objects that are related to the current data set being prefetched where these other objects may reside in the same address space or in the same node of a hierarchical tree or in a non-consecutive address space or a different node/layer of the hierarchical tree. For example, if the dataset being prefetched is associated with a pitcher in a baseball game, in addition to retrieving the information to populate the pitcher character in the game, the server can also retrieve information such as the types of pitches that the given pitcher character can throw such as a fastball, curveball, slider, or sinker and any speed ranges that the pitcher character is able to throw these pitches at.

The server 102 then sends the prefetched data to the accelerator 104. The accelerator 104 stores this data in a portion 612 memory 614 reserved for prefetched data. For example, the accelerator 104 stores this data in a portion of slow memory such as flash so that the fast memory such as DRAM is not unnecessarily burdened with prefetch processing. As discussed above, prefetch data is usually not critical to the application since this data is to be used sometime in the future. However, the prefetched data can also be stored in fast memory as well. In one embodiment each of these prefetch data portions in memory are aggregated across a set of accelerators. Therefore, these prefetch data portions act as a single cache across the accelerators. This allows the accelerators 104 to share data across each other.

The accelerator 104, in one embodiment, utilizes a page replacement mechanism so that the memory storing prefetch does not become full or so that new prefetch data can be written to the prefetch memory 612 when full. In this embodiment, the accelerator 104 monitors usage of the data in the prefetch memory 612. Each time the data is used a counter is updated for that given data set. The accelerator 104 also determines a computing complexity associated with a given data set. This computing complexity can be based on resources required to process the prefetched dataset, processing time, and the like. The accelerator 104 then assigns a score/weight to each prefetched data set based on the counter data and/or the computing complexity associated therewith. The prefetcher uses this score to identify the prefetched data sets to remove from memory 612 when the memory 612 is substantially full so that new data can be stored therein. A prefetch agent may run on the server 102 as an assist to the prefetchers 602 on the accelerators 104. The prefetch agent can aggregate and correlate requests across accelerators 104 and present a single set of requests to the server memory hierarchy to avoid duplication of requests. The prefetch agent may use the "score" of the prefetch request to save the corresponding results in premium DRAM, cheaper flash memory or disk storage.

Multiplexing Users and Enabling Virtualization on the Hybrid Server

Figure 7:
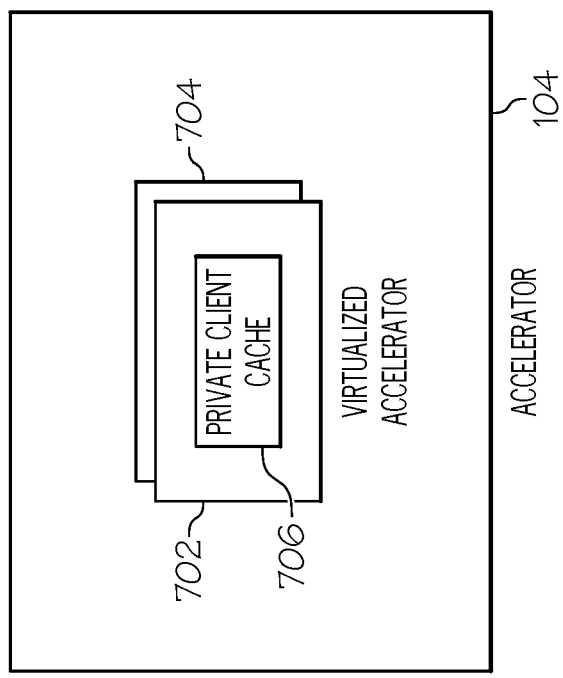
FIG. 7 is a block diagram showing one example of a virtualized configuration of an accelerator in an out-of-core processing environment according to one embodiment of the present invention.

In one or more embodiments, the hybrid server 114 supports multiple users. This is accomplished in various ways. For example, separate physical accelerators, virtualized accelerators with private cache clients, virtualized accelerators with snoopy private client caches, virtualized accelerators with elastic private client caches can be used. In an embodiment where separate physical accelerators 104 are utilized, each user is assigned separate physical accelerators. This is advantageous because each user can be confined to a physical accelerator without the overhead of sharing and related security issues. FIG. 7 shows one embodiment where virtualized accelerators are used. In particular, FIG. 7 shows that one or more of the accelerators 104 have been logically partitioned into one or more virtualized accelerators 702, 704, each comprising a private client cache 706. In this embodiment, each user is assigned a virtualized accelerator 702, 704. The physical resources of an accelerator 104 are shared between the virtualized accelerators 702, 704. Each virtualized accelerator 702, 704 comprises a private client cache 706 that can be used only by the virtualized accelerator that it is mapped to.

In another embodiment utilizing virtualized accelerators 702, 704 the private caches 706 are snoopy private client caches. These private client caches can snoop on traffic to other client caches if at least one common model ID or dataset identifier is being shared between different users. These private virtualized caches 706 can be distributed across virtual accelerators 104. In this embodiment, the virtualized accelerators 702, 704 are snooping data on the same physical accelerator 104. A virtualized accelerator directory agent 710, which manages virtualized accelerators 702, 704 on a physical accelerator 104 broadcasts requests to other virtualized accelerators 702, 704 sharing the same data set 110, e.g., model data. The private client caches 706 can respond with data, if they already have the data that one of the virtual accelerators requested from the server 102. This creates a virtual bus between the virtualized accelerators 702, 704. The virtualized accelerators 702, 704 on a physical accelerator 104 are able to share input data and output data. If users comprise the same state, e.g., multiple users are within the same area or volume of a virtual world, the virtualized accelerators 702, 704 can be joined (i.e. virtual accelerator 702 also performs the work for virtual accelerator 704) or logically broken apart to more efficiently process user requests and data. Also, multiple data sets can be daisy chained on one virtualized accelerator 702, 704. For example, an airplane model can be comprised of multiple models. Therefore, a hierarchy of models can be created at a virtualized accelerator as compared to one integrated model. For example, a model from the model hierarchy can be assigned to each virtual accelerator 702, 704. The virtual accelerators 702, 704 can be instantiated on a given physical accelerator 104. This allows the virtual accelerators 702, 704 to share data since it is likely that dataset accesses can likely be served from virtual accelerators in close proximity, since they all model datasets belong to the same hierarchy. Virtual accelerators 702, 704 can also span multiple physical accelerators 104. In this case, private client caches 706 can be comprised of memory resources across multiple physical accelerators 104.

In an embodiment that utilizes virtualized accelerators with elastic private client caches each user is assigned to a virtualized accelerator 702, 704. Private client caches are resident across physical accelerators i.e. memory resources can be used across accelerators 104. Each private client cache 706 is created with a "nominal" and "high" cache size. As the cache space is being used, the cache size of a virtual accelerator 702, 704 may be increased to "high". If other virtual accelerators 702, 704 choose to increase their cache size and memory resources are unavailable, then the virtual accelerator 702, 704 with the highest priority may be granted use of a higher cache size for performance purposes. Elasticity in cache sizes of an accelerator, allows it to cache all of the data required to satisfy a user client request.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Operational Flow Diagrams

Referring now to FIGS. 8-17, the flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
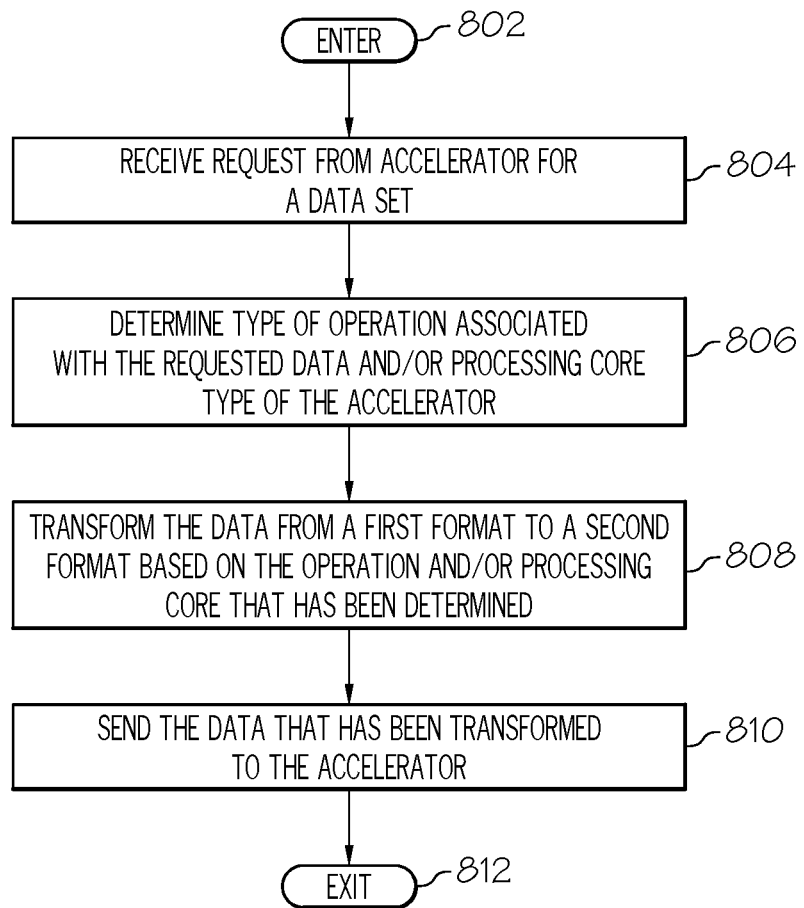
FIG. 8 is an operational flow diagram illustrating one example of preprocessing data at a server system in an out-of-core processing environment according to one embodiment of the present invention.

FIG. 8 is an operational flow diagram illustrating one example of preprocessing data at a server system in an out-of-core processing environment as discussed above. The operational flow of FIG. 8 begins at step 802 and flows directly into step 804. The server 102, at step 804, receives a request for a data set 110 from an accelerator 104. The server 102, at step 806, determines a type of operation associated with the requested data set and/or a type of processing core 112 residing at the accelerator 104. The server 102, at step 808, transforms the data from a first format into a second format based on the operation type and/or processing core type that has been determined. Alternatively, the server 102 can store data in various forms that can be directly consumed by the accelerators 104. The server 102, at step 810, sends the data set that has been transformed to the accelerator 104. The control flow then exits at step 812.

Figure 9:
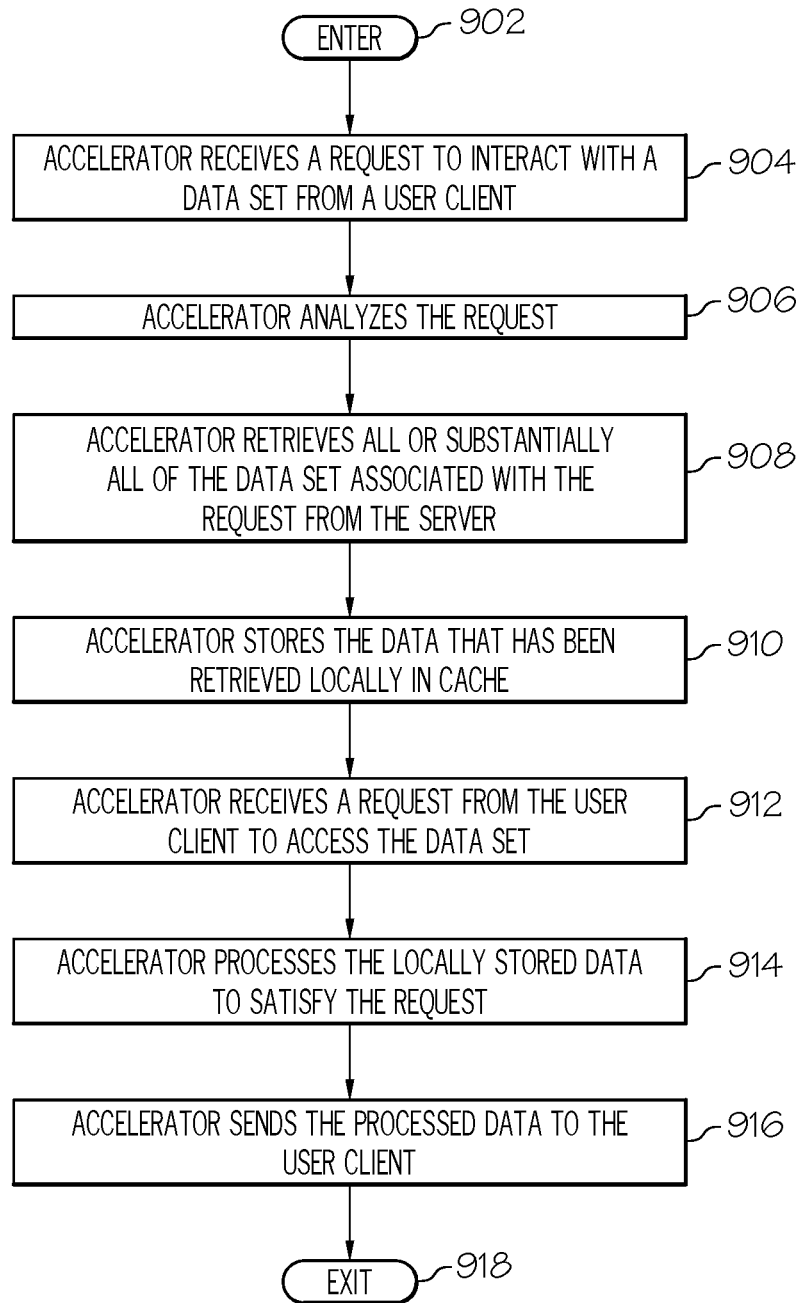
FIG. 9 is an operational flow diagram illustrating one example of an accelerator in an out-of-core processing environment configured according to a data access configuration of one embodiment of the present invention.

FIG. 9 is an operational flow diagram illustrating one example of an accelerator in an out-of-core processing environment configured according to a first data access configuration as discussed above. The operational flow of FIG. 9 begins at step 902 and flows directly into step 904. The accelerator 104, at step 904, receives a request 302 to interact with a data set 110 from a user client 106. The accelerator 104, at step 906, analyzes the request 302. The accelerator 104, at step 908, retrieves all or substantially all of the data set 110 associated with the request 302 from the server 102. The accelerator 104, at step 910, stores the data 304 that has been retrieved locally in cache 306. The accelerator 104, at step 912, receives a request from the user client 106 to access the data set 110. The accelerator 104, at step 914, processes the locally store data 304 to satisfy the request. The accelerator 104, at step 916, sends the processed data to the user client 106. The control flow then exits at step 1018.

Figure 10:
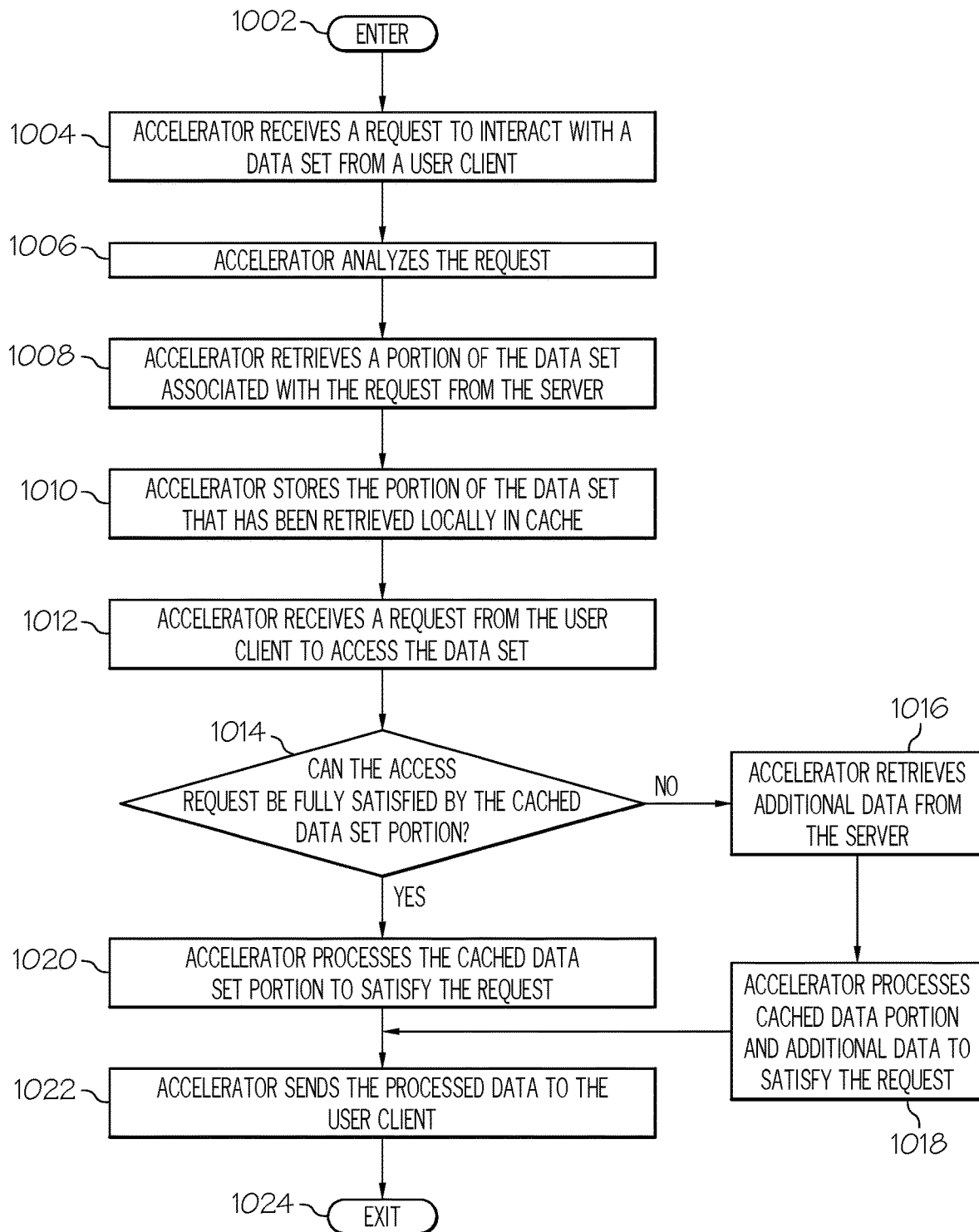
FIG. 10 is an operational flow diagram illustrating one example of an accelerator in an out-of-core processing environment configured according to another data access configuration according to one embodiment of the present invention.

FIG. 10 is an operational flow diagram illustrating another example of an accelerator in an out-of-core processing environment configured according to a second data access configuration as discussed above. The operational flow of FIG. 10 begins at step 1002 and flows directly into step 1004. The accelerator 104, at step 1004, receives a request 402 to interact with a data set 110 from a user client 106. The accelerator 104, at step 1006, analyzes the request 402. The accelerator 104, at step 1008, retrieves a portion 404 of the data set 110 associated with the request 402 from the server 102. The accelerator 104, at step 1010, stores the data portion 404 that has been retrieved locally in cache 406. The accelerator 104, at step 1012, receives a request from the user client 106 to access the data set 110.

The accelerator 104, at step 1014, determines if the request can be satisfied by the data portion 404. If the result of this determination is negative, the accelerator 104, at step 1016, retrieves additional data from the server 102. The accelerator 104, at step 1108, processes the data portion 404 and the additional data to satisfy the request. The control then flows to step 1022. If the result at step 1014 is positive, the accelerator 104, at step 1020, processes the cached data portion 404 to satisfy the request. The accelerator 104, at step 1022, sends the processed data to the user client 106. The control flow then exits at step 1024.

Figure 11:
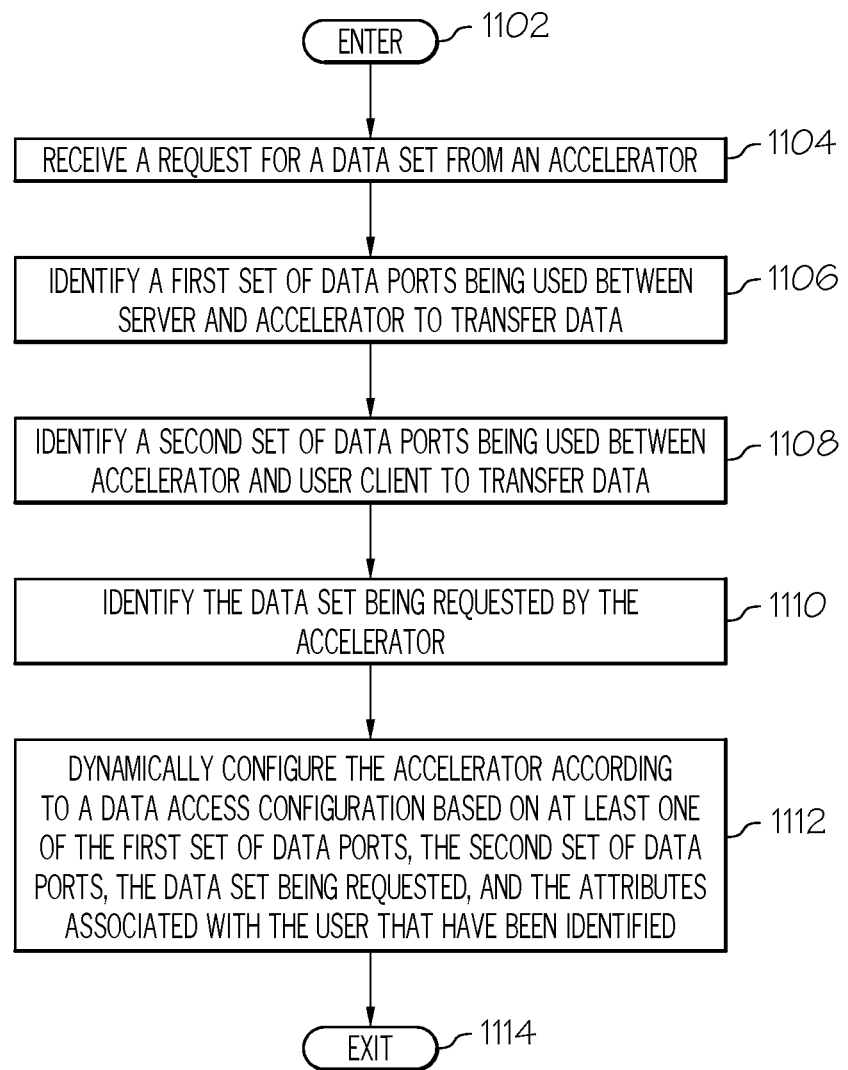
FIG. 11 is an operational flow diagram illustrating one example of dynamically configuring an accelerator in an out-of-core processing environment configured according to a data access configuration according to another data access configuration according to one embodiment of the present invention.

FIG. 11 is an operational flow diagram illustrating one example of dynamically configuring an accelerator in an out-of-core processing environment configured according to a data access configuration as discussed above. The operational flow of FIG. 11 begins at step 1102 and flows directly into step 1104. It should be noted that the following steps can be performed either by the server 102 and/or the accelerator 104. However, for illustrative purposes only, the following discussion is from the viewpoint of the server 102. The server 102, at step 1104, receives a request for a data set 110 from an accelerator 104. The server 102, at step 1106, identifies a first set of data ports being used between the server 102 and the accelerator 104 to transfer data.

The server 102, at step 1108, identifies a second set of ports being used between the accelerator 104 and the user client 106 to transfer data. The server 102, at step 1110, identifies the data being requested by the accelerator 104. The server 102, at step 1112, identifies a set of attributes associated with a user requesting access to the data set 110. The server 102, at step 1114, dynamically configures the accelerator 104 according to a data access configuration based on at least one of the first set of data ports, the second set of data ports, the data set being requests, and the attributes associated with the user that have been identified. The control flow then exits at step 1114.

Figure 12:
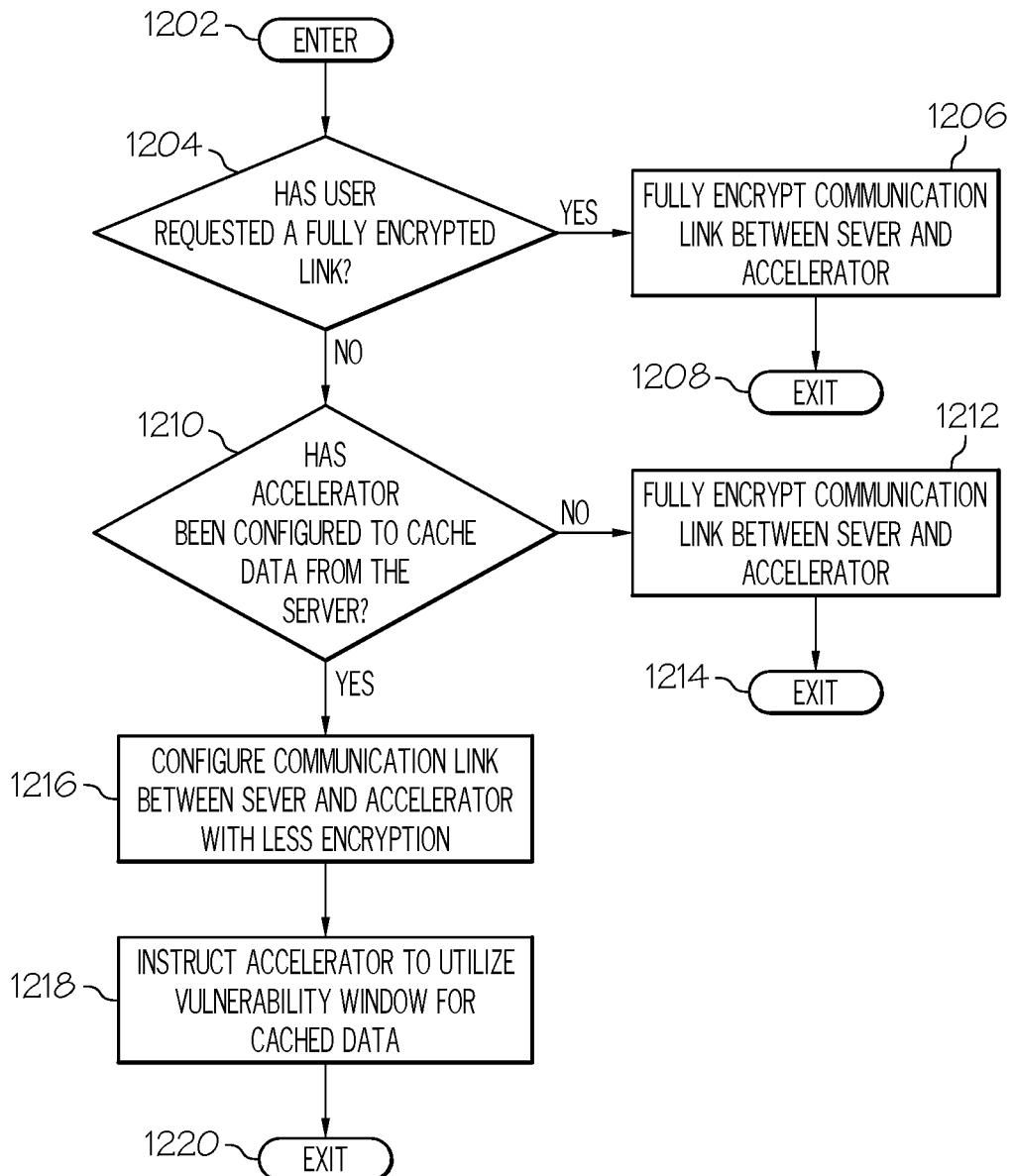
FIG. 12 is an operational flow diagram illustrating one example of dynamically establishing a secured link between a server and an accelerator in an out-of-core processing environment according to another data access configuration according to one embodiment of the present invention.

FIG. 12 is an operational flow diagram illustrating one example of dynamically establishing a secured link between a server and an accelerator in an out-of-core processing environment as discussed above. The operational flow of FIG. 12 begins at step 1202 and flows directly into step 1204. It should be noted that the following steps can be performed either by the server 102 and/or the accelerator 104. However, for illustrative purposes only, the following discussion is from the viewpoint of the server 102. The server 102, at step 1204, determines if a user has requested a fully encrypted link. If the result of this determination is positive, the server 102, at step 1206, fully encrypts a communication link between the server 102 and the accelerator 104. The control flow then exits at step 1208. If the result of this determination is negative, the server 102, at step 1210, determines if the accelerator 104 has been configured to cache data from the server 102.

If the result of this determination is negative, the server 102, at step 1212, fully encrypts the communication link between the server 102 and the accelerator 104. The control flow then exits at step 1214. If the result of this determination is positive, the server 102, at step 1216, configures the communication link between the server 102 and the accelerator 104 with encryption on partial data or encryption on all the data with lower strength. The server 102, at step 1218, instructs the accelerator 104 to utilize a vulnerability window mechanism for the cached data to offset any reduction in system confidence due to partial data encryption or lower strength encryption. The control flow then exits at step 1220.

Figure 13:
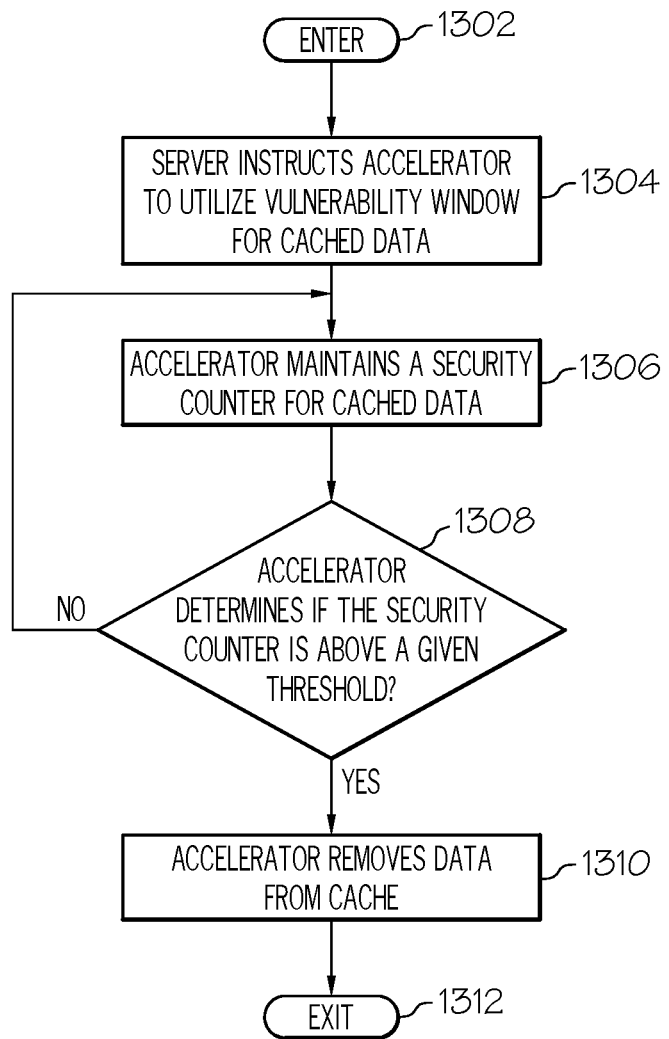
FIG. 13 is an operational flow diagram illustrating one example of maintaining a vulnerability window for cached data by an accelerator in an out-of-core processing environment according to one embodiment of the present invention.

FIG. 13 is an operational flow diagram illustrating one example of maintaining a vulnerability window for cached data by an accelerator in an out-of-core processing environment as discussed above. The operational flow of FIG. 13 begins at step 1302 and flows directly into step 1304. The server 102, at step 1304, instructs the accelerator 104 to utilize a vulnerability window mechanism for cached data. The accelerator 104, at step 1306, maintains a security counter 124 for the cached data. The accelerator 104, at step 1308, determines if the security counter 124 is above a given threshold. If the result of this determination is negative, the control flow returns to step 1306. If the result of this determination is positive, the accelerator 104, at step 1310, purges the data 304 from the cache 306. The control flow then exits at step 1312.

Figure 14:
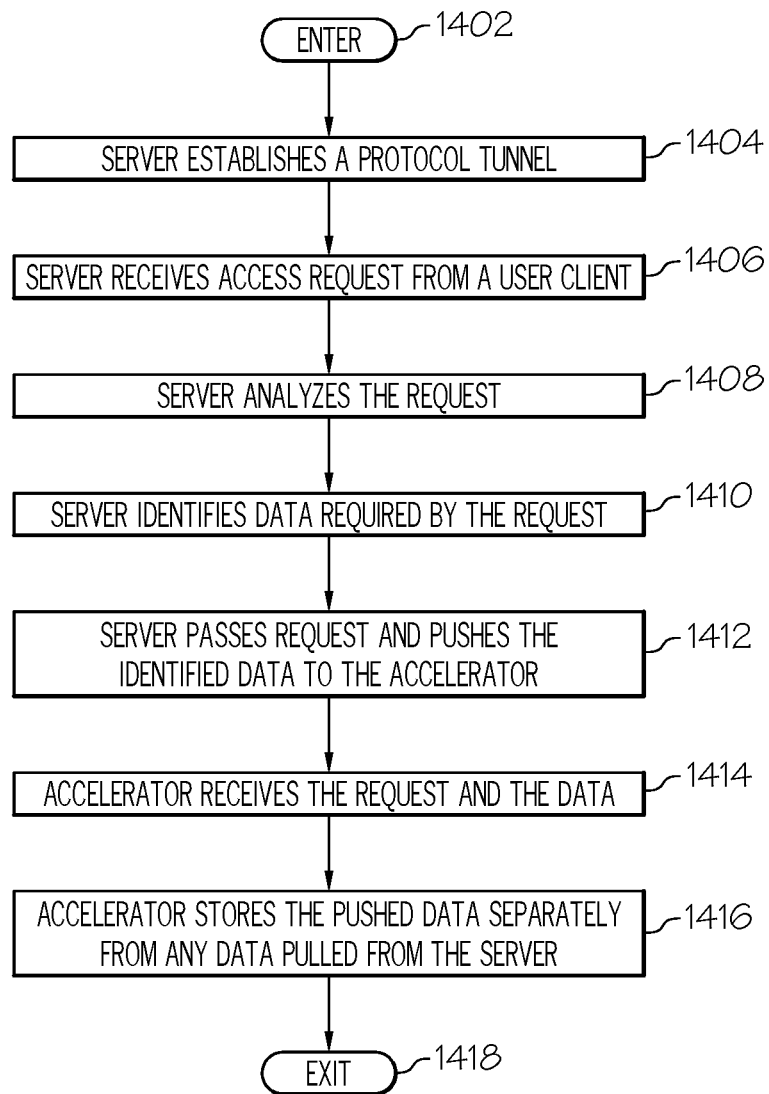
FIG. 14 is an operational flow diagram illustrating one example of utilizing a protocol tunnel at a server in an out-of-core processing environment according to one embodiment of the present invention.

FIG. 14 is an operational flow diagram illustrating one example of utilizing a protocol tunnel at a server in an out-of-core processing environment as discussed above. The operational flow of FIG. 14 begins at step 1402 and flows directly into step 1404. The server 102, at step 1404, establishes a protocol tunnel 502. The server 102, at step 1406, receives an access request from a user client 106. The server 102, at step 1408, analyzes the request. The server 102, at step 1410, identifies a data set required by the access request. The server 102, at step 1412, passes the access request to the accelerator 104 and pushes the identified data to the accelerator 104. It should be noted that pushing the result data and user client request may be staggered to the accelerator 104. The accelerator 104, at step 1414, receives the access request and pushed data. The accelerator 104, at step 1416, stores the pushed data separately from any data pulled from the server 102. The control flow then exits at step 1418.

Figure 15:
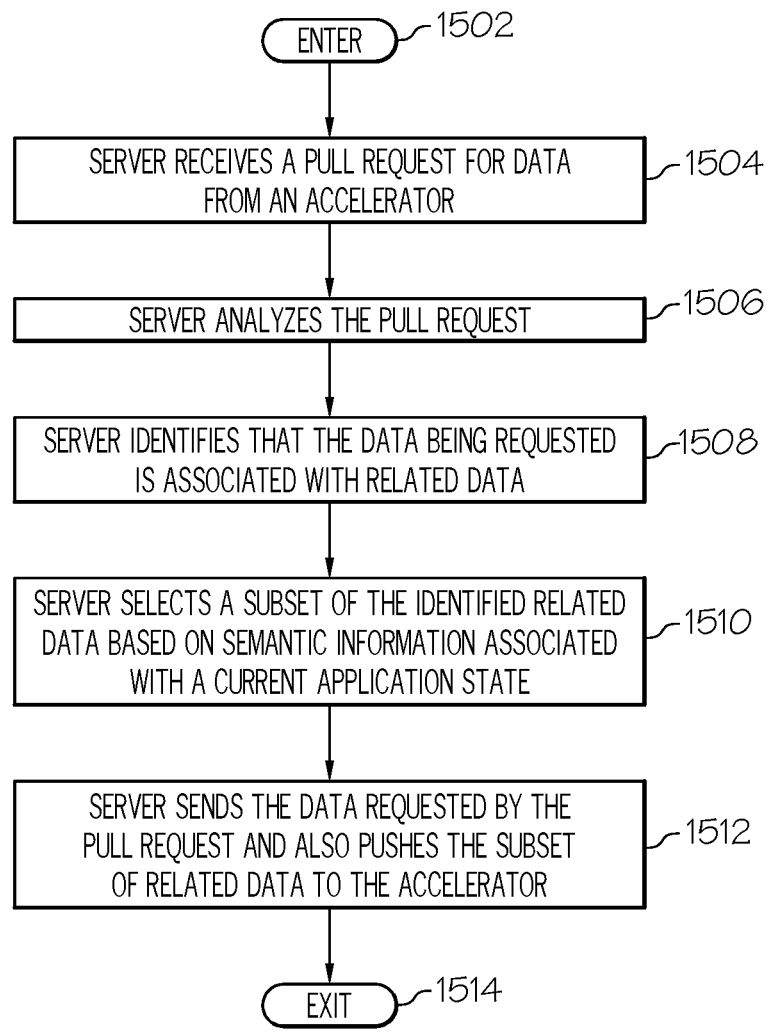
FIG. 15 is an operational flow diagram illustrating one example of a server in an out-of-core processing environment utilizing semantic analysis to push data to an accelerator according to one embodiment of the present invention.

FIG. 15 is an operational flow diagram illustrating one example of a server in an out-of-core processing environment utilizing semantic analysis to push data to an accelerator as discussed above. The operational flow of FIG. 15 begins at step 1502 and flows directly into step 1504. The server 102, at step 1504, receives a pull request from an accelerator 104. The server 102, at step 1506, analyzed the pull request. The server 102, at step 1508, identifies that the data being requests is associated with related data. The server 102, at step 1510, selects a subset of the related data based on semantic information associated with a current application state associated with the data. The server 102, at step 1512, sends the data requested by the pull request and the subset of related data to the accelerator 104. The control flow then exits at step 1514.

Figure 16:
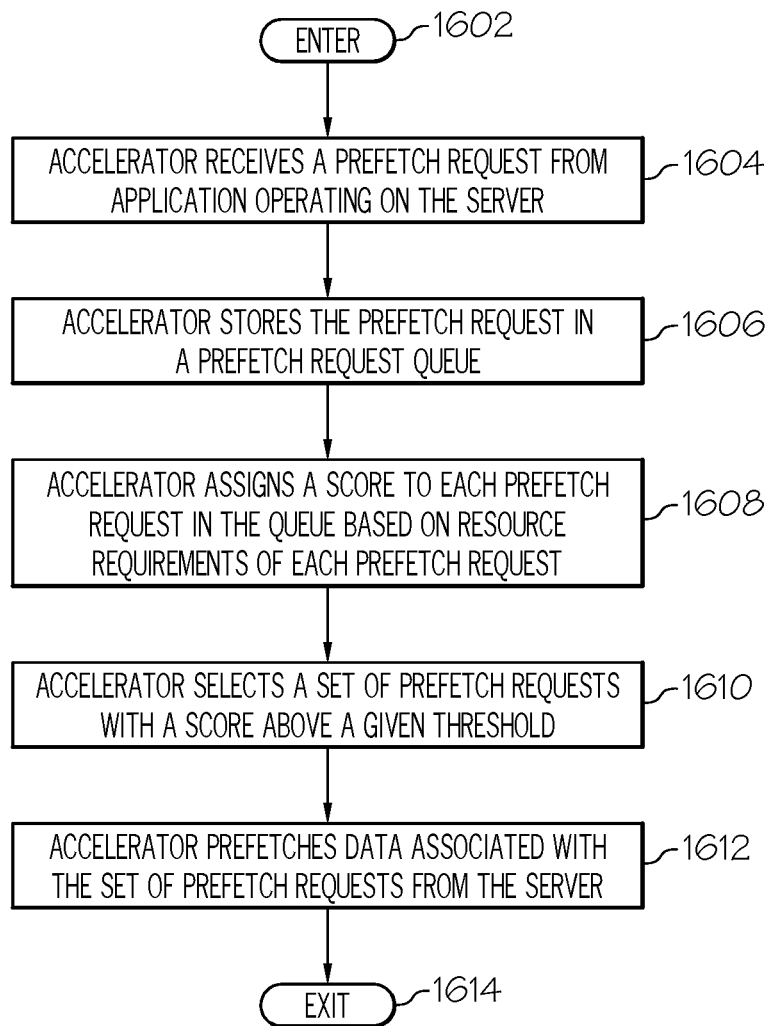
FIG. 16 is an operational flow diagram illustrating one example of an accelerator in an out-of-core processing environment prefetching data from a server according to one embodiment of the present invention.

FIG. 16 is an operational flow diagram illustrating one example of an accelerator in an out-of-core processing environment prefetching data from a server as discussed above. The operational flow of FIG. 16 begins at step 1602 and flows directly into step 1604. The accelerator 104, at step 1604, receives a prefetch request 608 from an application 604 operating at the server 102 and the user client. The accelerator 104, at step 1606, stores the prefetch request 608 in a prefetch request queue 610. The accelerator 104, at step 1608, assigns a score to each prefetch request 608 based at least on the resource requirements of each request 608. The accelerator 104, at step 1610, selects a set of prefetch requests with a score above a given threshold. The accelerator 104, at step 1612, prefetches data associated with the set of prefetch requests from the server 102 and user client.

The control flow then exits at step 1614.

Figure 17:
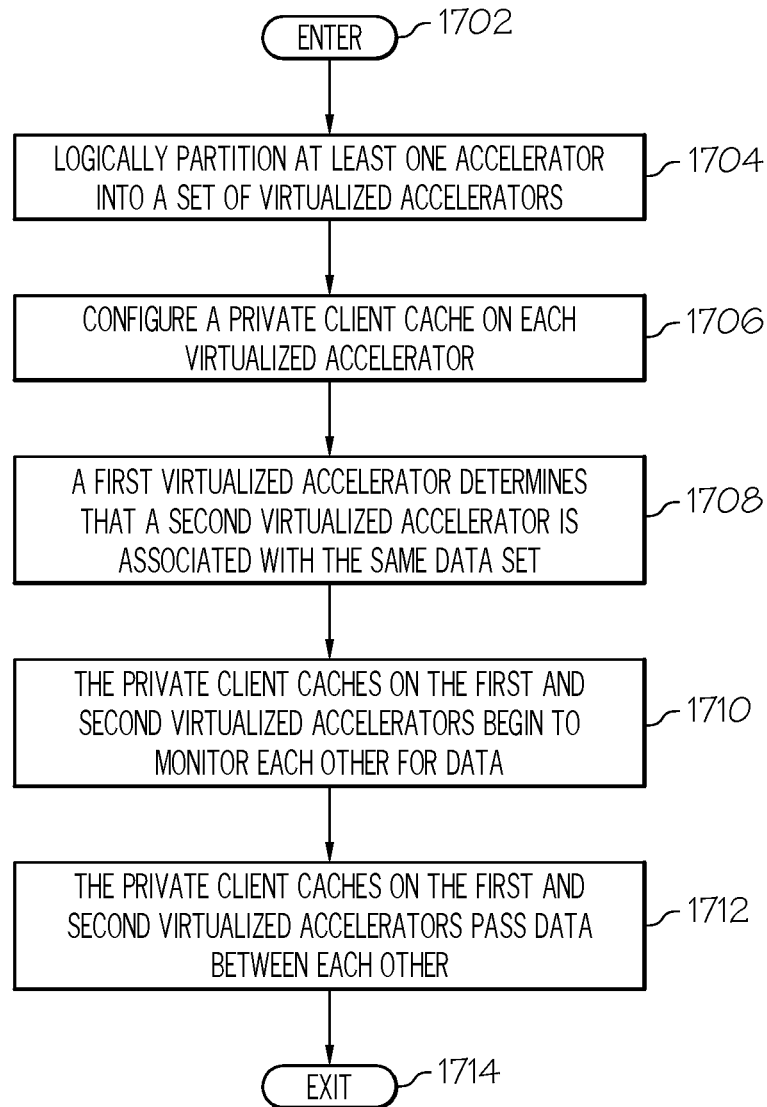
FIG. 17 is an operational flow diagram illustrating one example of logically partitioning an accelerator in an out-of-core processing environment into virtualized accelerators according to one embodiment of the present invention.

FIG. 17 is an operational flow diagram illustrating one example of logically partitioning an accelerator in an out-of-core processing environment into virtualized accelerators as discussed above. The operational flow of FIG. 17 begins at step 1702 and flows directly into step 1704. It should be noted that the following steps can be performed either by the server 102 and/or the accelerator 104. The server 102, at step 1704, logically partitions at least one accelerator 104, into one or more virtualized accelerators 702, 704. The server 102, at step 1706, configures a private client cache 706 on each virtualized accelerator 702, 704. A first virtualized accelerator 702, at step 1708, determines that a second virtualized accelerator 704 is associated with the same data set 110. The private caches 706 on the first and second virtualized servers 702, 704, at step 1710, monitor each other for data. The first and second virtualized accelerators 702, 704, at step 1712, transfer data between each other. The control flow then exits at step 1714.

Information Processing System

Figure 18:
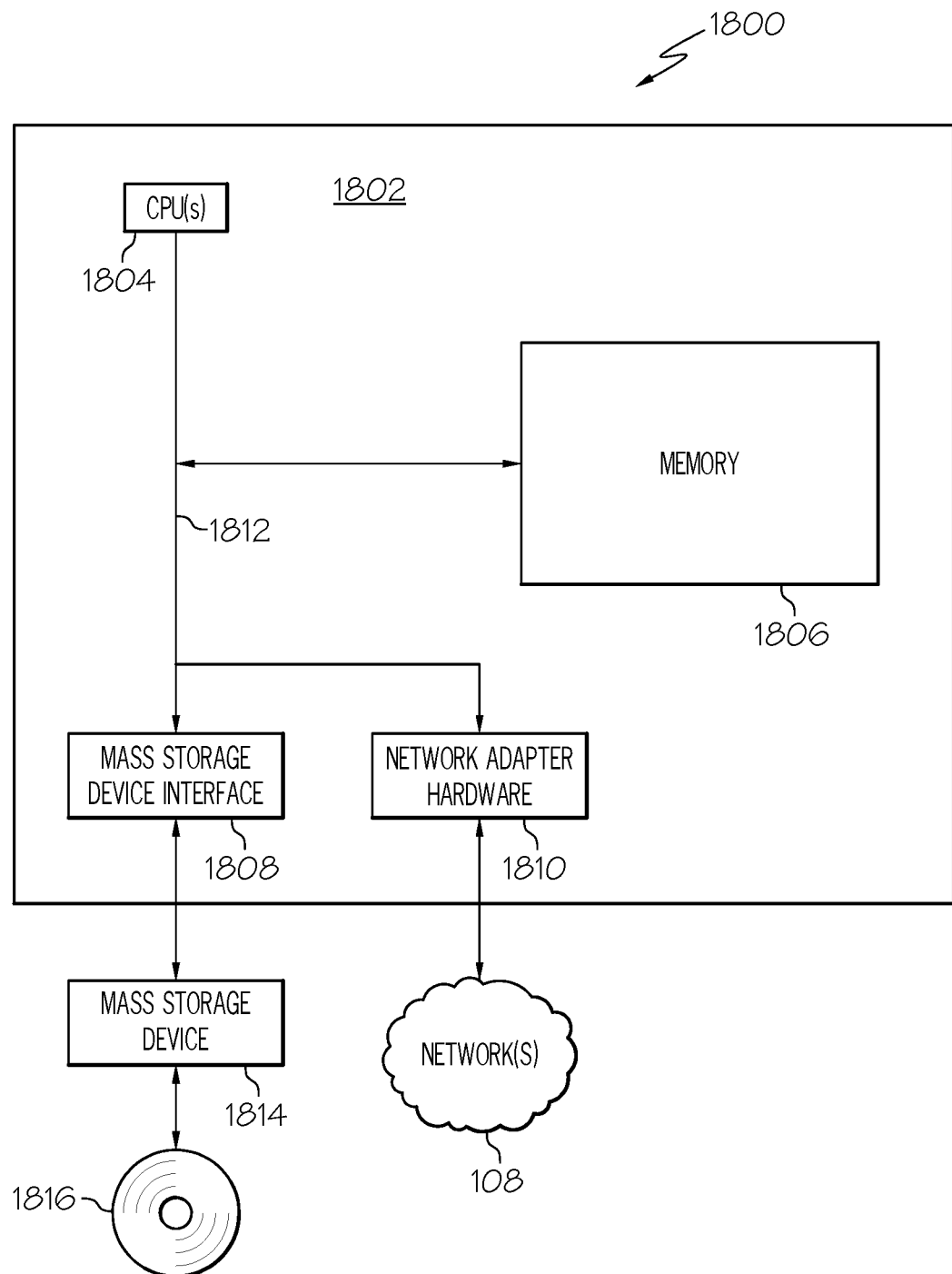
FIG. 18 is a block diagram illustrating detailed view of an information processing system according to one embodiment of the present invention.

FIG. 18 is a block diagram illustrating a more detailed view of an information processing system 1800 that can be utilized in the operating environment 100 discussed above with respect to FIG. 1. The information processing system 1800 is based upon a suitably configured processing system adapted to implement one or more embodiments of the present invention. Similarly, any suitably configured processing system can be used as the information processing system 1800 by embodiments of the present invention. It should be noted that the information processing system 1800 can either be the server system 102 or the accelerator system 104.

The information processing system 1800 includes a computer 1802. The computer 1802 has a processor(s) 1804 that is connected to a main memory 1806, mass storage interface 1808, and network adapter hardware 1810. A system bus 1812 interconnects these system components. The main memory 1806, in one embodiment, comprises either the components of the server system 102 such as the data sets 110, data access manager 118, security manager 122, memory system 202, data preprocessor 212, snooping module 504, and applications 604 or the components of accelerator 104 such as the request manager 120, security counter 124, elastic resilience module 126, gated memory 210, requests 302, cache 306, prefetcher 602, and prefetch request queues 610 discussed above.

Although illustrated as concurrently resident in the main memory 1806, it is clear that respective components of the main memory 1806 are not required to be completely resident in the main memory 1806 at all times or even at the same time. In one embodiment, the information processing system 1800 utilizes conventional virtual addressing mechanisms to allow programs to behave as if they have access to a large, single storage entity, referred to herein as a computer system memory, instead of access to multiple, smaller storage entities such as the main memory 1806 and data storage device 1816. Note that the term "computer system memory" is used herein to generically refer to the entire virtual memory of the information processing system 1800.

The mass storage interface 1808 is used to connect mass storage devices, such as mass storage device 1814, to the information processing system 1800. One specific type of data storage device is an optical drive such as a CD/DVD drive, which may be used to store data to and read data from a computer readable medium or storage product such as (but not limited to) a CD/DVD 1816. Another type of data storage device is a data storage device configured to support, for example, NTFS type file system operations.

Although only one CPU 1804 is illustrated for computer 1802, computer systems with multiple CPUs can be used equally effectively. Embodiments of the present invention further incorporate interfaces that each includes separate, fully programmed microprocessors that are used to off-load processing from the CPU 1804. An operating system (not shown) included in the main memory is a suitable multi-tasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 1800. The network adapter hardware 1810 is used to provide an interface to a network 108. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 1816, CD ROM, or other form of recordable media, or via any type of electronic transmission mechanism.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a computer readable storage medium or a program product via CD or DVD, e.g. CD, CD-ROM, or other form of recordable media, and/or according to alternative embodiments via any type of electronic transmission mechanism.

What is claimed is:

1. A method, with a server system in an out-of-core processing environment, comprising:

partitioning memory within the server system into a first set of memory managed by a plurality of accelerator systems and a second set of memory managed by the server system;

assigning different portions of memory within the server system to a plurality of accelerator systems, wherein the different portions of memory are to be managed by the plurality of accelerator systems; and receiving data within the first set of memory, wherein the data is directly written into the first set of memory by at least one of the accelerator systems of the plurality of accelerator systems.

2. The method of claim 1, wherein the first set of memory is private to the plurality of accelerator systems.

3. The method of claim 1, further comprising:
releasing at least a portion of the second memory to one or more accelerator systems of the plurality of accelerator systems.

4. The method of claim 1, further comprising:
determining that an accelerator system of the plurality of accelerator systems has released a portion memory residing at the accelerator system; and
accessing, based on the determining, the portion of memory residing at the accelerator system.

5. The method of claim 1, further comprising:
disallowing access to the second set of memory by the plurality of accelerator systems.

6. The method of claim 1, wherein the partitioning comprises:
assigning, to each accelerator system of the plurality of accelerator systems, a portion of the first set of memory as private memory that is only accessible by the accelerator system.

7. The method of claim 6, wherein a remaining portion of the first of memory is accessible by all the accelerator systems of the plurality of accelerator systems.

8. A server system in an out-of-core processing environment, the server system comprising:
a memory;
a processor communicatively coupled to the memory; and
a data manager communicatively coupled to the memory and the processor, wherein the data manager is configured to perform:
partitioning memory within the server system into a first set of memory managed by a plurality of accelerator systems and a second set of memory managed by the server system;
assigning different portions of memory within the server system to a plurality of accelerator systems, wherein the different portions of memory are to be managed by the plurality of accelerator systems; and
receiving data within the first set of memory, wherein the data is directly written into the first set of memory by at least one of the accelerator systems of the plurality of accelerator systems.

9. The server system of claim 8, wherein the first set of memory is private to the plurality of accelerator systems.

10. The server system of claim 8, wherein the data manager is further configured to perform:
releasing at least a portion of the second memory to one or more accelerator systems of the plurality of accelerator systems.

11. The server system of claim 8, wherein the data manager is further configured to perform: determining that an accelerator system of the plurality of accelerator systems has released a portion memory residing at the accelerator system; and
accessing, based on the determining, the portion of memory residing at the accelerator system.

12. The server system of claim 8, wherein the data manager is further configured to perform: disallowing access to the second set of memory by the plurality of accelerator systems.

13. The server system of claim 8, wherein the partitioning comprises:
assigning, to each accelerator system of the plurality of accelerator systems, a portion of the first set of memory as private memory that is only accessible by the accelerator system, wherein a remaining portion of the first of memory is accessible by all the accelerator systems of the plurality of accelerator systems.

14. A computer program product for managing accelerator system access to data, the computer program product comprising a non-transitory storage medium readable by a processing circuit and storing instructions for execution by the processing circuit for performing a method comprising:
partitioning memory within the server system into a first set of memory managed by a plurality of accelerator systems and a second set of memory managed by the server system;
assigning different portions of memory within the server system to a plurality of accelerator systems, wherein the different portions of memory are to be managed by the plurality of accelerator systems; and
receiving data within the first set of memory, wherein the data is directly written into the first set of memory by at least one of the accelerator systems of the plurality of accelerator systems.

15. The computer program product of claim 14, wherein the first set of memory is private to the plurality of accelerator systems.

16. The computer program product of claim 14, wherein the method further comprises:
releasing at least a portion of the second memory to one or more accelerator systems of the plurality of accelerator systems.

17. The computer program product of claim 14, wherein the method further comprises:
determining that an accelerator system of the plurality of accelerator systems has released a portion memory residing at the accelerator system; and
accessing, based on the determining, the portion of memory residing at the accelerator system.

18. The computer program product of claim 14, wherein the method further comprises:
disallowing access to the second set of memory by the plurality of accelerator systems.

19. The computer program product of claim 14, wherein the partitioning comprises:
assigning, to each accelerator system of the plurality of accelerator systems, a portion of the first set of memory as private memory that is only accessible by the accelerator system.

20. The computer program product of claim 19, wherein a remaining portion of the first of memory is accessible by all the accelerator systems of the plurality of accelerator systems.

* * * * *